US012617499B2

(12) United States Patent　　　　(10) Patent No.:　US 12,617,499 B2
Pruszynski et al.　　　　　　　　　　(45) Date of Patent:　　May 5, 2026

(54) GATE SYSTEM FOR A PONTOON BOAT

(71) Applicant: Polaris Industries Inc., Medina, MN (US)

(72) Inventors: Aleksander Pruszynski, Granger, IN (US); Adam T. Weis, Elkhart, IN (US); Bradley R. Fishburn, Syracuse, IN (US); Thomas E. Smead, III, Jones, MI (US)

(73) Assignee: POLARIS INDUSTRIES INC., Medina, MN (US)

( * ) Notice: Subject to any disclaimer, the term of this patent is extended or adjusted under 35 U.S.C. 154(b) by 406 days.

(21) Appl. No.: 18/373,332

(22) Filed: Sep. 27, 2023

(65) Prior Publication Data

US 2024/0017799 A1　　Jan. 18, 2024

Related U.S. Application Data

(63) Continuation-in-part of application No. 17/837,195, filed on Jun. 10, 2022, now Pat. No. 12,358,595.

(60) Provisional application No. 63/216,417, filed on Jun. 29, 2021.

(51) Int. Cl.
　　*B63B 35/34*　　　　(2006.01)
　　*E06B 11/02*　　　　(2006.01)
　　*B60N 5/00*　　　　(2006.01)

(52) U.S. Cl.
　　CPC ............ *B63B 35/34* (2013.01); *E06B 11/022* (2013.01); *B60N 5/00* (2013.01)

(58) Field of Classification Search
　　CPC .......... B63B 35/34; E06B 11/022; B60N 5/00
　　See application file for complete search history.

(56) References Cited

U.S. PATENT DOCUMENTS

| | | | | |
|---|---|---|---|---|
| 5,105,755 | A * | 4/1992 | Davidson ................ | B63B 17/04 |
| | | | | 114/120 |
| 6,843,468 | B2 * | 1/2005 | Marshall ................ | A47K 3/003 |
| | | | | 256/65.16 |
| 8,028,641 | B1 * | 10/2011 | Sly .......................... | B63B 29/04 |
| | | | | 297/3 |
| 10,029,761 | B2 * | 7/2018 | Poppell ..................... | B63B 1/14 |
| 10,308,320 | B1 * | 6/2019 | O'Neal ................... | B63B 35/38 |
| 12,358,595 | B2 | 7/2025 | Fishburn et al. | |
| 2002/0148398 | A1 * | 10/2002 | Mensch ................ | B60F 3/0092 |
| | | | | 114/61.15 |
| 2005/0235901 | A1 * | 10/2005 | Blaisdell ................ | B63B 17/00 |
| | | | | 114/361 |
| 2013/0025524 | A1 * | 1/2013 | Cooney ................. | E05B 17/007 |
| | | | | 114/343 |
| 2022/0411022 | A1 * | 12/2022 | Fishburn ................. | B63B 1/125 |
| 2024/0017799 | A1 * | 1/2024 | Pruszynski ............. | B63B 35/34 |
| 2025/0319946 | A1 | 10/2025 | Fishburn et al. | |

OTHER PUBLICATIONS

"U.S. Appl. No. 17/837,195, Non Final Office Action mailed Dec. 27, 2024", 6 pgs.

(Continued)

*Primary Examiner* — Marc Q Jimenez
*Assistant Examiner* — Jovon E Hayes
(74) *Attorney, Agent, or Firm* — SCHWEGMAN LUNDBERG & WOESSNER, P.A.

(57)　　　　　　ABSTRACT

A gate system for a pontoon boat is provided. The gate system may comprise a gate, a guide, and a guide interface member.

22 Claims, 15 Drawing Sheets

(56) References Cited

OTHER PUBLICATIONS

"U.S. Appl. No. 17/837,195, Response filed Feb. 28, 2025 to Non Final Office Action mailed Dec. 27, 2024", 8 pgs.
"U.S. Appl. No. 17/837,195, Notice of Allowance mailed Mar. 25, 2025", 8 pgs.

* cited by examiner

GATE SYSTEM FOR A PONTOON BOAT

CROSS-REFERENCE TO RELATED APPLICATION

The present application is a continuation-in-part of U.S. patent application Ser. No. 17/837,195, filed on Jun. 10, 2022, which claims priority to U.S. Provisional Patent Application No. 63/216,417, filed on Jun. 29, 2021, the disclosures of which are incorporated herein by reference in their entireties.

FIELD

The present disclosure relates to systems and methods for an above deck gate system for a pontoon boat and, more particularly, to a gate system with a guide and a guide interface member for a pontoon boat.

BACKGROUND

Pontoon boats often have an enclosure system supported by the deck that serves as a boundary of a passenger compartment of the pontoon boat, with a wall and a number of gates positioned around the enclosure system. Traditional gate systems require a user to lift the gate from a catch, and then manually swing the gate open. However, once opened, the gate may swing freely, and users may be required to lift the gate again to close it.

SUMMARY

In an exemplary embodiment of the present disclosure, a pontoon boat is provided. The pontoon boat comprising: a plurality of pontoons; a deck supported by the plurality of pontoons; an enclosure system supported by the deck, the enclosure system including a wall, a gate support structure of the pontoon boat including the wall of the enclosure system and the deck; the enclosure system further including a gate system including a gate rotatably coupled to the gate support structure, wherein the gate is movable from a first position to a second position, and a guide system supported by the plurality of pontoons, the guide system including a guide and a guide interface member, a first portion of the guide system is coupled to the gate, a second portion of the guide system is coupled to the gate supporting structure of the pontoon boat independent of the gate, the first portion being moveable relative to the second portion guide, wherein the guide interface member of the guide system slides along a surface of the guide to bias the gate from the first position to the second position.

In an example thereof, the second portion of the guide system includes the guide and the first portion of the guide system includes the guide interface member. In a variation thereof, the guide comprises a guide trough configured to receive the guide interface member. In a further variation thereof, the second position is an open position and in the second position the guide interface member is received within the guide trough. In yet a further variation thereof, in the second position the gate has an opening angle from 30° to 180°. In still a further variation thereof, the second position the gate has an opening angle from 30° to 120°. In another variation thereof, the guide is coupled to the deck within an interior of the enclosure system. In a further variation thereof, the gate is movable from the second position to a third position and in the third position the gate has a greater opening angle than in the second position. In yet a further variation thereof, the guide comprises a first guide trough and a second guide trough, each of which are configured to receive the guide interface member, in the second position the guide interface member is received within the first guide trough, and in the third position the guide interface member is received within the second guide trough. In still a further variation thereof, the guide comprises a guide trough configured to receive the guide interface member, in the second position the guide interface member is received in the guide trough, and in the third position the guide interface member is positioned at a greater opening angle than the guide trough.

In another exemplary embodiment of the present disclosure, a pontoon boat is provided. The pontoon boat comprising: a plurality of pontoons; a deck supported by the plurality of pontoons; an enclosure system supported by the deck, the enclosure system including a wall, a gate support structure of the pontoon boat including the wall of the enclosure system and the deck; the enclosure system further including a gate system including a gate rotatably coupled to the gate support structure, wherein the gate is movable from a first position wherein the gate is parallel with an adjacent portion of the wall to a second position and from the second position to a third position wherein the gate is angled relative to the adjacent portion of the wall at an angle, the angle being between 30° and 180°; the gate system further including a guide supported by the deck independent of the gate, the guide having a sloped surface; and a guide interface member carried by the gate and configured to interface with the sloped surface to move the gate from the third position to the second position in the circumstance of a lateral force being applied to the gate.

In an example thereof, the gate moves vertically relative to the adjacent wall portion when moved to or from the second position.

In another example thereof, the gate system further comprising a gate catch configured to maintain the gate in the first position.

In yet another example thereof, the first position is a closed position, the second position is a lifted position, and the third position is an open position. In a variation thereof, in the second position, the gate remains parallel with the adjacent portion of the wall.

In still another example thereof, the gate is movable from the second position to the third position without an applied force from a user.

In a further still example thereof, the guide interface member is configured to interface with the sloped surface to bias the gate from the second position to the third position.

In a further exemplary embodiment of the present disclosure, a method of moving a gate is provided. The method comprising: lifting a gate from a closed position to a lifted position; positioning a guide interface member carried by the gate; the gate over a guide supported by the deck; releasing the gate; sliding the guide interface member along a surface of the guide towards a stopped open position; and receiving the guide interface member within a guide trough of the guide in the stopped open position.

In an example thereof, the method further comprises the step of moving the gate from the stopped open position to the lifted position by applying a lateral force to the gate, wherein the guide interface member biases the gate upward by interfacing with the guide when the lateral force is applied.

In another example thereof, the method further comprises the step of moving the gate from the stopped open position to a further open position by applying a lateral force to the gate, wherein the guide interfacing member biases the gate upward by interfacing with the guide when the lateral force is applied.

In an exemplary embodiment of the present disclosure, a pontoon boat is provided. The pontoon boat includes a plurality of pontoons, a deck supported by the plurality of pontoons, an enclosure system supported by the deck, the enclosure system including a wall, a gate support structure, a gate including a vertical frame member rotatably coupled to the gate support structure, and a guide system including a first portion being coupled to a lower portion of the gate and extending beyond a lower edge of the gate and a second portion extending above a top surface of the deck, wherein the gate is movable from a first position to a second position, the guide system including a guide and a guide interface member, wherein one of the first portion and the second portion of the guide system includes the guide and another of the first portion and the second portion includes the guide interface member, wherein the guide interface member of the guide system slides along a surface of the guide to bias the gate from the first position to the second position.

In an example thereof, the second portion of the guide system includes the guide and the first portion of the guide system includes the guide interface member, the first portion being an end cap coupled to a lower end of the vertical frame member of the date.

In an example thereof, the guide comprises a guide trough configured to receive the guide interface member.

In an example thereof, the second position is an open position and in the second position the guide interface member is received within the guide trough.

In an exemplary embodiment of the present disclosure, a pontoon boat is provided. The pontoon includes a plurality of pontoons, a deck supported by the plurality of pontoons, an enclosure system supported by the deck, the enclosure system including a wall, a gate support structure, a gate including a vertical frame member rotatably coupled to the gate support structure, an end cap coupled to a lower end of the vertical frame member and including an interfacing body downward from the vertical frame member, and a guide coupled to the deck, wherein the guide includes a surface configured to receive the interfacing body and bias the gate toward an open position, wherein the guide is positioned substantially within a profile of the gate when viewed from above the enclosure along a direction perpendicular to a rotational axis of the gate.

In an example thereof, the end cap and the guide each define a quadrangular outer profile when viewed from above.

In an example thereof, the guide defines a guide surface including a quarter bowl shape.

In an example thereof, the interfacing body of the end cap includes an interfacing surface that is complimentary to the guide surface.

In an example thereof, the interfacing surface and the guide surface are configured such that the interfacing surface and the guide surface have increasing contact by surface area as the gate transitions from the closed position toward the open position.

In an example thereof, when the gate is in the open position, the guide does not extend beyond a vertical plane defined by an exterior side of the gate.

In an example thereof, when the gate is in a closed position, the guide is positioned adjacent to a vertical plane defined by an interior side of the gate, the guide extending less than 2 inches inward from the vertical plane.

In an example thereof, the enclosure system includes a gate catch operable to retain the gate in the closed position, wherein the gate catch includes a stopping member, wherein the stop member is vertically higher than the guide.

In an exemplary embodiment of the present disclosure, a guide system for a gate configured to pivot between an open positioned and a closed position is provided. The guide system includes an end cap configured to couple to a lower end of a vertical frame member of a gate, the end cap including an interfacing body configured to be positioned facing downward when coupled to the gate, the end cap defining a first outer profile when viewed from above; and a guide coupled to the deck, wherein the guide includes a guide surface configured to receive the interfacing body, wherein the guide includes a second outer profile when viewed from above, wherein the second outer profile and the first outer profile are substantially similar in size and shape.

In an example thereof, the first outer profile is from about 80% to about 100% similar in size and shape to the second outer profile.

In an example thereof, the first outer profile and the second outer profile are quadrangular.

In an example thereof, the guide surface includes a quarter bowl shape.

In an example thereof, the interfacing body includes an interfacing surface that is complimentary to the guide surface.

In an example thereof, the interfacing surface and the guide surface are configured such that the interfacing surface and the guide surface have increasing contact by surface area as the gate transitions from the closed position toward the open position.

In an example thereof, the guide includes a guide stop defining a boundary of the guide surface, wherein the guide stop is configured to contact a side wall of the interfacing body.

In an example thereof, the guide has an open end of the guide surface adjacent to the boundary of the guide surface.

In an exemplary embodiment of the present disclosure, a pontoon boat is provided. The pontoon boat includes a plurality of pontoons, a deck supported by the plurality of pontoons; a guide supported by the plurality of pontoons; an enclosure system supported by the deck, the enclosure system including a wall and a gate movable relative to the wall between a closed position wherein the gate is inline with the wall and an opened position, the gate interfacing with the guide in the opened position to hold the gate in the opened position, the gate and the wall cooperating to define a walkway lane when the gate is in the opened position, the guide being outside of the walkway lane.

In an example thereof, the gate is angled relative to the wall at least 75 degrees.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
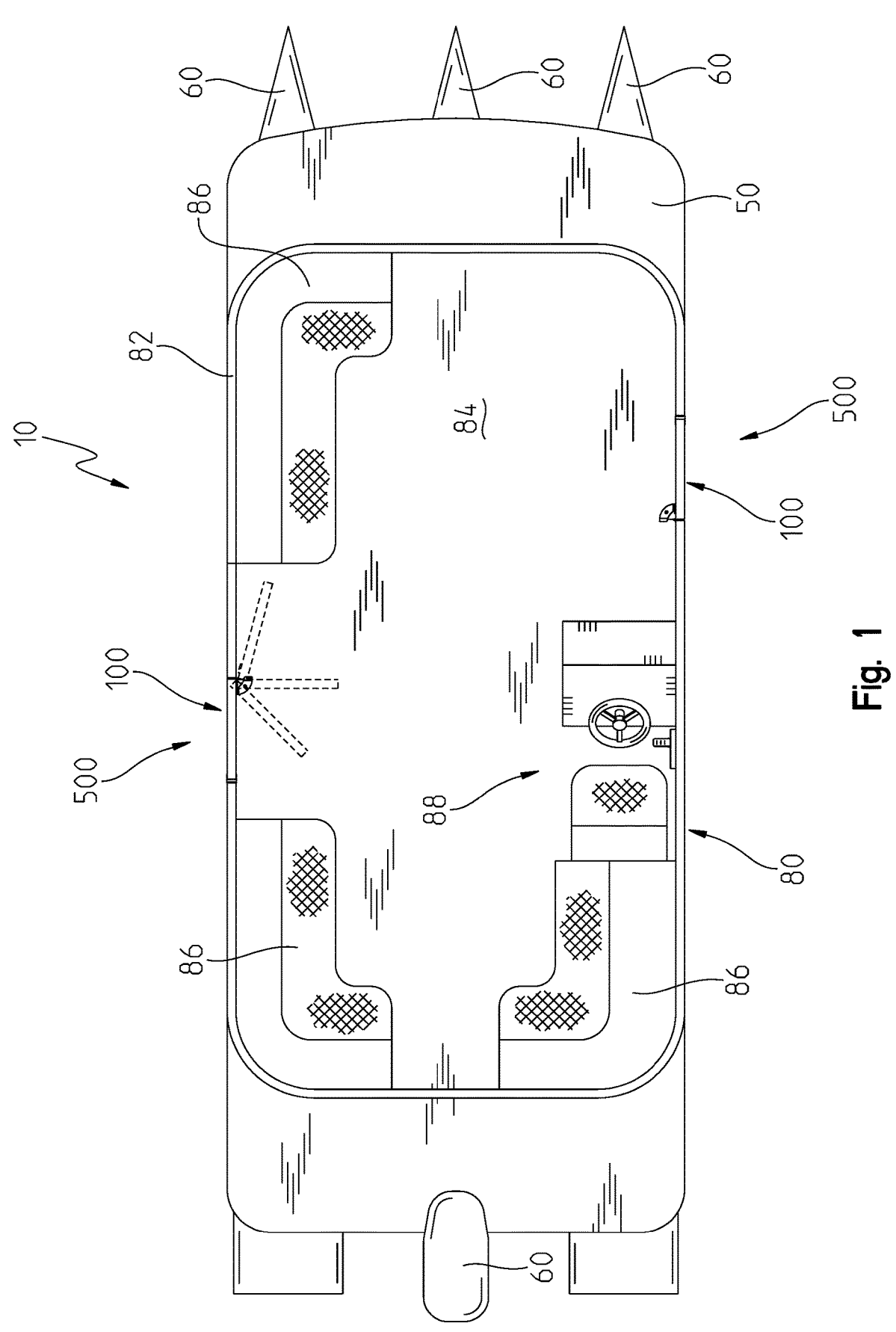
FIG. 1 illustrates an aerial view of a pontoon boat with a number of gates.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring first to FIG. 1, a pontoon boat 10 is shown. Pontoon boat 10 includes a driving system 60 (e.g. a motor), a number of pontoons 30, a deck 50 coupled to and supported by the pontoons 30, and an enclosure system 80 coupled to and supported by the deck 20. Enclosure system 80 includes a wall 82. Wall 82 may be comprised of multiple sections and include posts, rails, panels, and other components which extend above deck 50 to present a boundary. In FIG. 1, wall 82 generally surrounds an occupant area 84 of pontoon boat 10. Occupant area 84 includes seating 86 for one or more passengers and an operator station 88 which includes controls to steer pontoon boat 10 and to control driving system 60. Occupant area may additionally include tables, flooring, storage space, or any other boat features as are known in the art.

In embodiments, wall 82 does not surround occupant area 84, rather one or more gaps are provided in wall 82. In examples, these gaps remain unfilled and that portion of deck 50 allows unrestricted passage between occupant area 84 and the remainder of deck In examples, one or more of these gaps are filled by a gate system 500 including a gate 100 (see FIG. 1).

Gate 100 of gate system 500 is coupled to a gate support structure of pontoon boat 10. The gate support structure includes any component of boat 10 that is supported by the plurality of pontoons and not swingable with gate 100. For example, deck 50 and wall 82 are part of the gate support structure.

A gate 100 is generally configured to be opened and closed for users to pass through when moving between the interior and exterior of boat 10. While the illustrated embodiment shows two gates 100 on boat 10, any number of gate systems 500 and gates 100 may be used. Gates 100 may be solid or have one or more openings therethrough.

Figure 2:
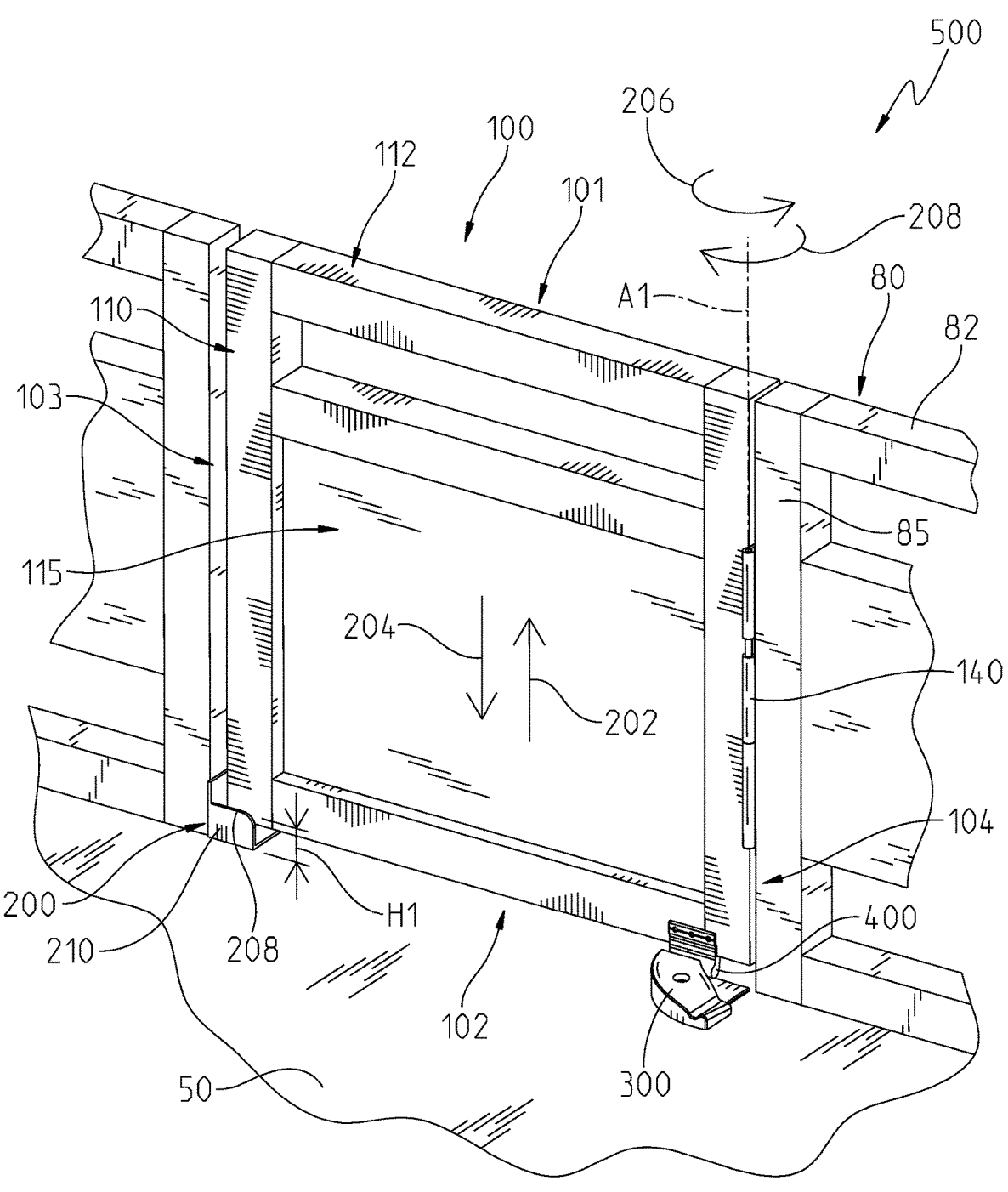
FIG. 2 illustrates an exemplary gate system including a gate.

Referring now to FIG. 2, gate system 500 is illustrated. Gate system 500 includes a gate 100, a gate catch 200, a guide 300, and a guide interface member 400. Gate 100 is rotatably coupled to an adjacent portion of wall 80 through a hinge 140. As will be described in more detail herein, gate catch 200 holds gate 100 in a closed position until a user lifts gate 100 in direction 202 above an upper edge 208 gate catch 200 and pushes or pulls gate 100 towards an open position. Hinge 140, as is known in the art, is designed to permit gate 100 to be moved vertically in directions 202, 204.

Figure 3:
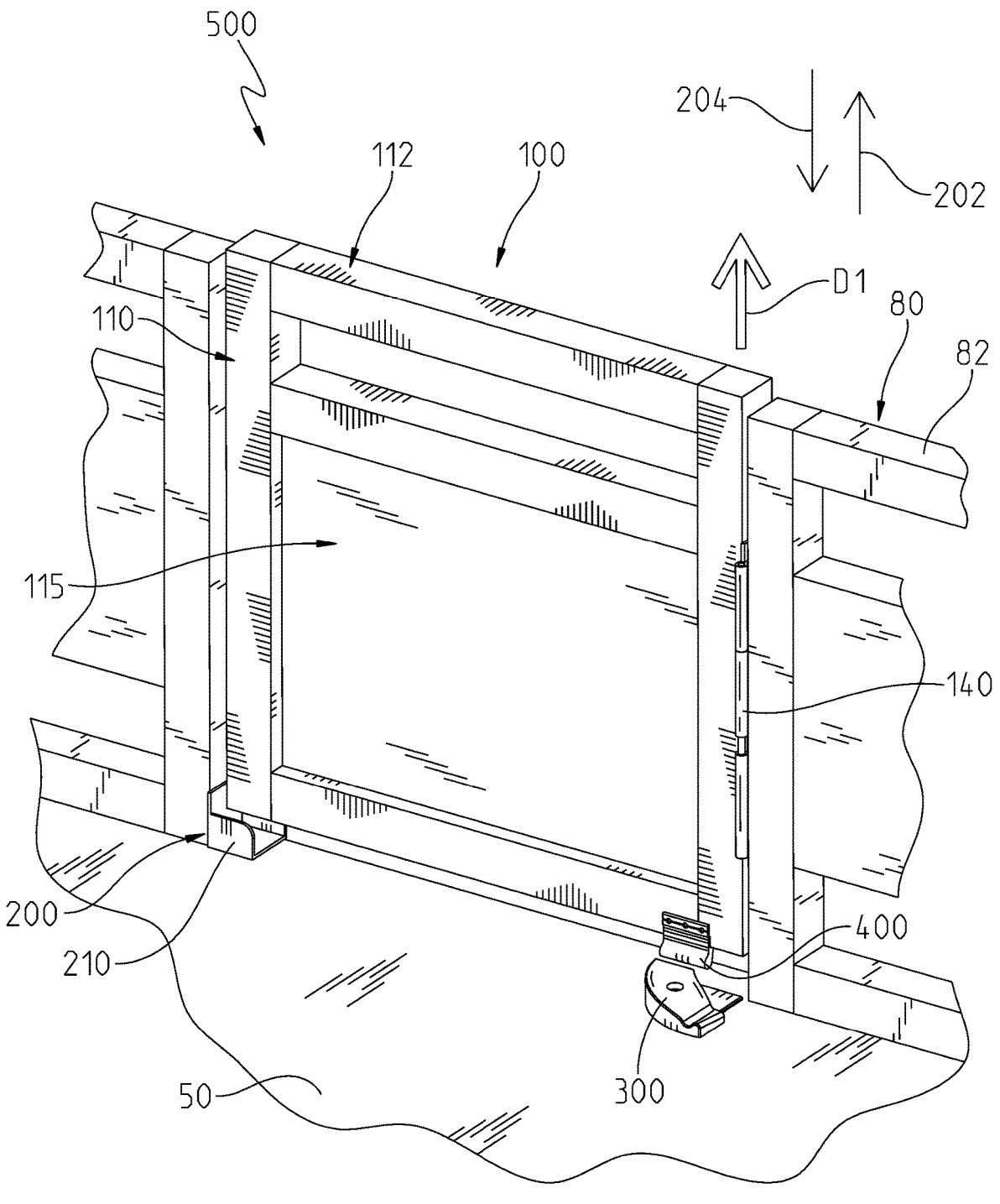
FIG. 3 illustrates the gate of the gate system of FIG. 2 in a lifted position relative to an adjacent wall section.
Figure 4:
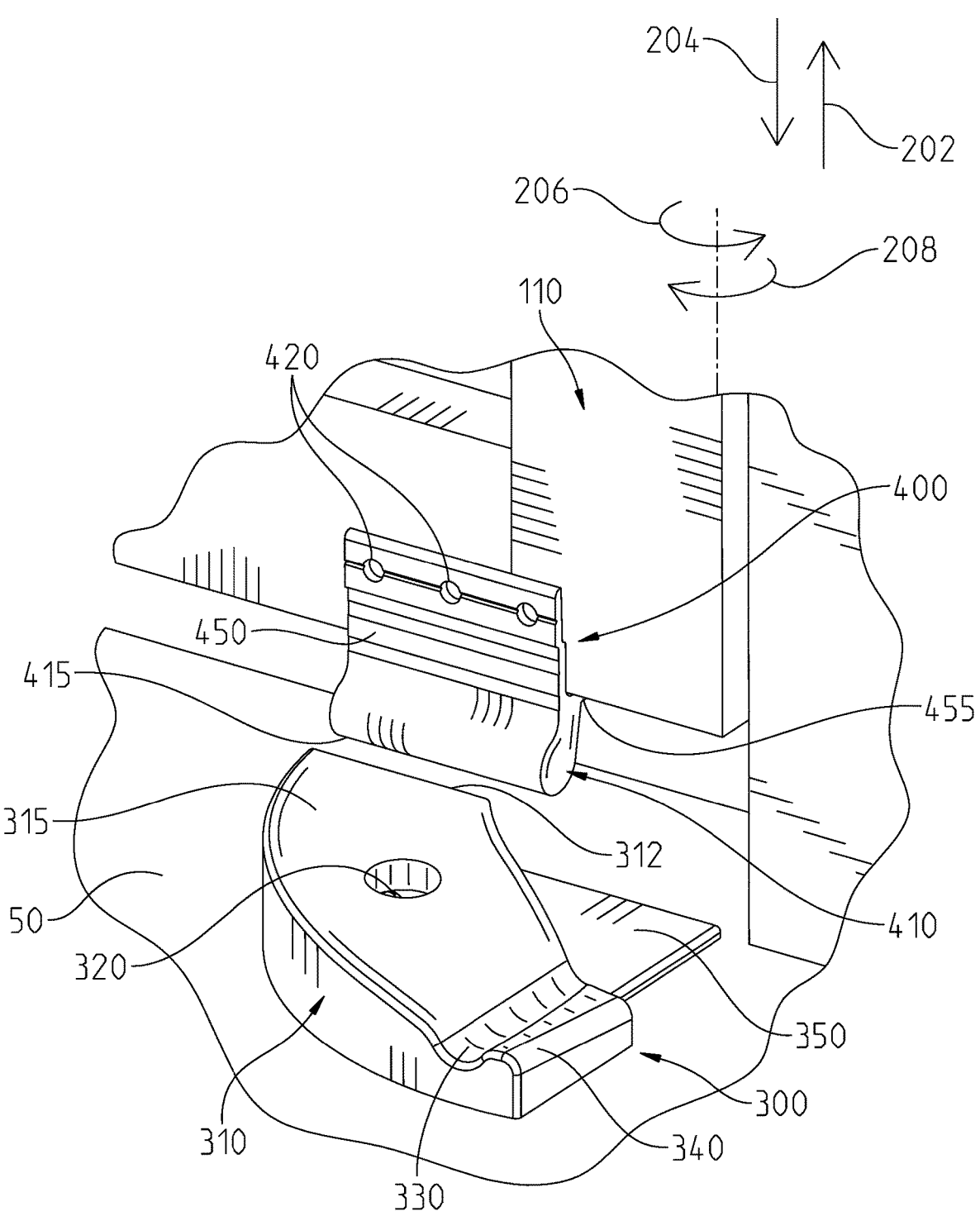
FIG. 4 is a partial view of the gate system of FIG. 3.

Guide 300 is coupled to the gate support structure of boat 10, illustratively to deck 50 with a fastener (see FIG. 4). Guide interface member 400 is coupled to and carried by gate 100. Once gate 100 is lifted by a user in direction 202 (see FIG. 3) a lower edge of guide interface member 400 is positioned vertically higher than guide 300. If gate 100 is rotated by the user about hinge 140 (axis A1) in direction 206 guide interface member 400 may be positioned over guide 300 and lowered in direction 204 to contact guide 300. The user may then release gate 100. Once released, the weight of gate 100 will bias guide interface member 400 towards guide 300 (if not already contacting guide 300) and guide 300 will bias gate 100 towards an open position (see FIGS. 5 and 6). A user may move gate 100 beyond the open position (see FIG. 7). To close gate 100, a user may apply a lateral force (push or pull) to gate 100 towards the closed position without lifting gate 100, and guide 300 will bias gate 100 upward to clear gate catch 200 and allow gate 100 to close.

In FIG. 2, gate 100 is shown in a closed position, which may also be referred to as a first position. Gate 100 illustratively includes a gate frame 110, an upper rail 112, and a gate panel 115. Gate 100 generally extends vertically between an upper end 101 and a lower end 102, and horizontally between a first end 103 and a second end 104. Gate 100 is rotatably coupled to a post 85 of an adjacent portion of wall 82 of enclosure system 80 through hinge 140 proximate second end 104 which allows for rotation of gate 100 around the axis A1 of hinge 140 in directions 206 and 208. Upper rail 112 may act as a handle or interactive member for a user to grab or interact with gate 100 to actuate a movement of gate 100 relative to the adjacent portion of wall 82 of enclosure system 80. For example, a user may grab or otherwise contact upper rail 112 to lift, push, or pull gate 100. Gate 100 may also include additional interactive features or components not illustrated, such as handles, knobs, latches, recesses, buttons, locking mechanisms, bumpers, grip surfaces, coatings, and any other feature found on gates. Additionally, gate 100 and/or the gate support structure may include biasing members to bias gate 100 towards an open or closed position, such as springs. Gate 100 may also comprise biasing members to bias gate 100 upwards or downwards between lifted and non-lifted positions.

Gate panel 115 may be a skin used in pontoon boat enclosures, and may be comprised of sheet metal, polymer, wood, or any other suitable material configured to extend between members of gate frame 110. Further, gate panel 115 may be flat or contoured. While gate 100 is illustrated as a gate with frame 110 and gate panel 115, gate 100 may comprise any gate or door structure as is known in the art.

Referring to FIG. 2, Gate catch 200 retains gate 100 in a closed position and comprises at least one stopping member 210. Stopping member 210 is configured to interact with at least a portion of gate 100 to prevent movement of gate 100 beyond a threshold. In the illustrated embodiment, gate catch 200 comprises two stopping members 210 (See FIG. 6) to prevent gate 100 from opening outward or inward while positioned between the two stopping members 210. In the illustrated embodiment, the inboard stopping member 210 has a height H1 while the outboard stopping member 210 has a second height higher than H1. The outboard stopping member 210 acts as a stop. In other embodiments each stopping member 210 has the same height or for outboard swinging gates the inboard stopping member 210 has a higher height than the outboard stopping member 210. Gate catch 200 may be coupled to wall 82 of enclosure system 80 and/or deck 50 through any fastening system known in the art, including but not limited to screws, bolts, rivets, nails, adhesives, welds, integral coupling features, and any other suitable coupling mechanism. Additionally, gate catch 200 may be integral to the deck 50 and/or a portion of enclosure system 80.

Referring now to FIG. 3, gate 100 is shown in a lifted position, which may also be referred to as a first position (relative to an open position) or a second position (relative to a closed, lowered position). In order to open gate 100, a user may lift gate 100 upward in direction 202 (illustrated as direction D1) (which is generally parallel with axis A1) by a height that the lower extent of lower end 102 of gate 100 is positioned above stopping member 210. Once lifted, gate 100 may no longer be retained within gate catch 200 and may swing freely about axis A1. In the illustrated embodiments, gate 100 is shown as opening inward relative to the boat 10, but gate 100 may be opened inwardly or outwardly based on the configuration of hinge 140.

Referring to FIG. 4, guide 300 and guide interface member 400 are shown, which are both positioned proximate the second end 104 of gate 100. In other embodiments, guide 300 and guide interface member 400 may be positioned anywhere along gate 100 between first end 103 and second end 104. Guide 300 comprises a guide body 310, an upper edge 312, a guide surface 315, a fastening feature 320, a guide trough 330, a guide stop 340, and a guide mounting plate 350. Guide 300 generally extends from deck 50 to upper edge 312. Guide 300 is generally shaped as a ramp or a cam, with guide surface 315 sloping downward from upper edge 312 towards guide trough 330. The slope of guide surface 315 may be constant or variable along its length, and guide surface 315 may comprise any curved, or straight profile at any point along its length. In the illustrated embodiment, the slope of guide surface 315 is greater near guide trough 330 than upper edge 312. Guide 300 may be mounted to deck 50 through fastening feature 320. Fastening feature 320 may be configured to receive a fastener such as a screw, bolt, rivet, nail, pin, or any other suitable fastening device to couple guide 300 to deck 50. Any number of fastening features 320 may be present on guide 300. Guide 300 may also be mounted to deck 50 through guide mounting plate 350. Guide mounting plate 350 may be configured to provide support for guide 300 and may also comprise fastening features to couple guide 300 to deck 50. In addition to fastening features 320, guide 300 may be coupled to deck 50 through any other suitable fastening systems, such as adhesives, welds, protrusions/detents, latches, clips, or any other fastening system. Additionally, guide 300 may be integral to the deck 50. Guide 300 may be composed of a metal, polymer, natural products (e.g. wood), or any other suitable material as well as combinations thereof (e.g. polymer coated metal), and may be manufactured through any process as is known in the art such as molding, machining, welding, casting, and additive manufacturing.

Guide interface member 400 comprises an interfacing body 410, an interfacing surface 415, a mounting plate 450 including a plurality of fastening features 420. Guide interface member 400 is generally coupled proximate lower end 102 of gate 100 and extends at least partially below lower end 102. Guide interface member 400 may be coupled to gate 100 through fastening features 420 on mounting plate 450. Mounting plate 450 may be aligned with a portion of gate 100 and fastening features 420 may interact with any fastener to couple guide interface member 400 to gate 100, such as a screw, bolt, rivet, nail, pin, or any other suitable fastening device. Guide interface member 400 may also couple with gate 100 through any other suitable fastening systems, such as adhesives, welds, protrusions/detents, latches, clips, or any other fastening system. Additionally, guide interface member 400 may comprise a mounting feature 455 to interact with another surface on gate 100. In the illustrated embodiment, mounting feature 455 interfaces with a lower side of gate 100 such that guide interface member 400 interfaces with gate 100 on two sides. Mounting feature 455 may provide additional structural support to guide interface member 400, and/or may aid in coupling guide interface member 400 to gate 100. Mounting feature 455 may comprise fastening features 420 and may couple with gate 100 in the same ways that mounting plate 450 may couple with gate 100. Additionally, guide interface member 400 may be integral to the gate 100. Guide interface member 400 may be composed of a metal, polymer, natural products (e.g. wood), or any other suitable material as well as combinations thereof (e.g. polymer coated metal), and may be manufactured through any process as is known in the art such as molding, machining, welding, casting, and additive manufacturing.

When gate 100 is in a closed, non-lifted position as shown in FIG. 2, the lower extent of interfacing body 410 is positioned below upper edge 312 of guide 300. Upper edge 312 may have a height relative to deck 50 of H1 or less than H1, such that when gate 100 is lifted as shown in FIGS. 3 and 4, and lower end 102 is at or above H1 (and therefore at or above stopping member 210), the lower extent of interfacing body 410 may be positioned at or above upper edge 312.

Figure 5:
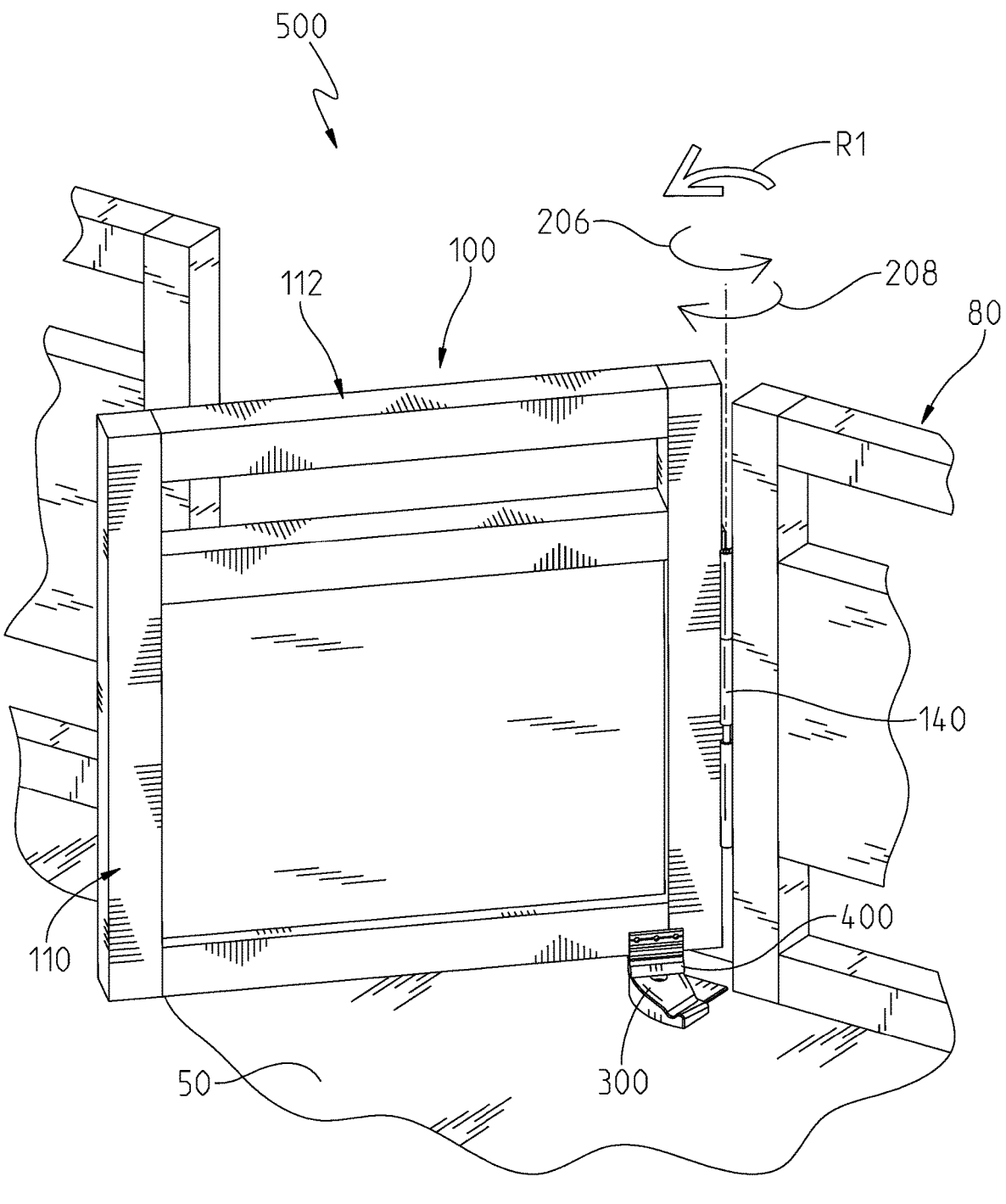
FIGS. 5-7 illustrate movement of the gate of the gate system of FIG. 2 from the lifted position of FIG. 3 to multiple open positions.

Referring now to FIGS. 4 and 5, gate 100 may be rotated in direction 206 (designated R1 in FIG. 5) towards an open position. An open position may be any position that is not a closed position, encompassing any degree of opening greater or less than zero degrees relative to a closed position. Stated differently, an open position may encompass an opening angle from −180° to −1° and from 1° to 180°, relative to a closed position (where a negative angle may indicate an outward opening, and a positive angle may indicate an inward opening). An opening angle as used herein refers to the angle between gate 100 and the adjacent portion of wall 82 coupled to hinge 140 at an open position relative the closed position, such that when gate 100 is closed it has an opening angle of approximately 0°. An open position may be referred to as a second position (relative to a lowered closed position or a lifted closed position) or as a third position (relative to a lowered closed position). Once gate 100 is opened to a degree such that interfacing body 410 extends at least partially over guide surface 315 of guide 300, gate 100 may be lowered such that interfacing surface 415 may contact guide surface 315. Gate 100 may be released by a user, and guide 300 will then bias guide interface member 400, and gate 100 to which guide interface member 400 is coupled, towards a stopped open position defined by the positioning of guide trough 330 and guide stop 340. The ramped surface 315 of guide body 310 biases interfacing body 410 to move towards guide trough 330 as interfacing body 410 moves downward under the weight of gate 100. Guide surface 315 and interfacing surface 415 may be composed of relatively smooth materials with low coefficients of friction to allow for easy sliding of interfacing surface 415 along guide surface 315. Additionally, guide surface 315 and/or interfacing surface 415 may comprise a coating to reduce friction between guide surface 315 and interfacing surface 415. Interfacing body 410 and guide body 310 may comprise a generally curved cross-section or profile to allow for smooth sliding without facets or edges. In embodiments, one of guide 300 and guide interface member 400 may include wheels to aid in the relative movement therebetween.

Figure 6:
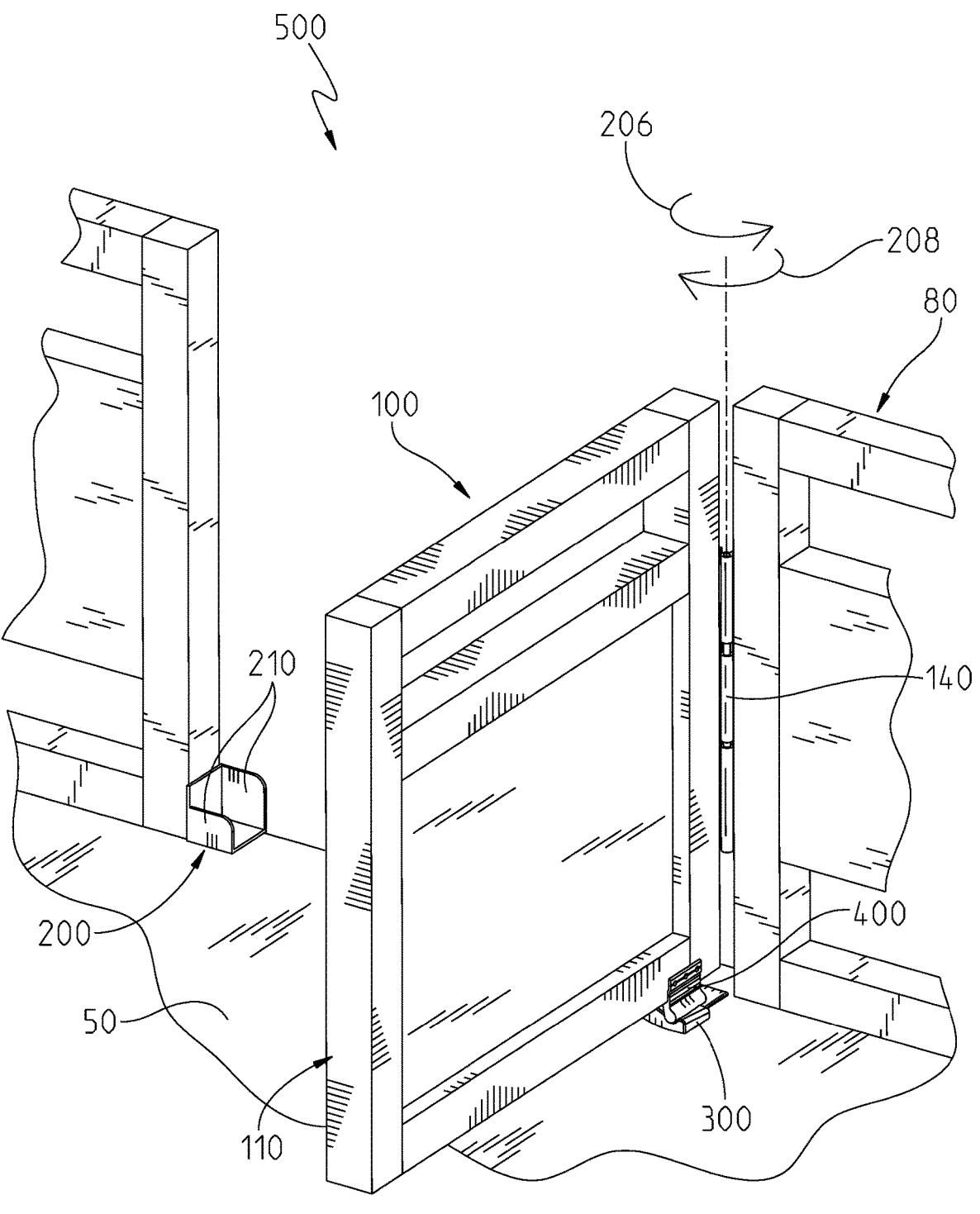

Referring now to FIGS. 4 and 6, interfacing body 410 may slide towards guide trough 330 which may be positioned at the bottom of the downwardly sloped portion of guide body 310. Interfacing body 410 may be configured to interact with guide trough 330 such that interfacing body 410 may be received within guide trough 330. Interfacing body 410 may slow or stop sliding once interfacing body 410 enters guide trough 330 and contacts guide stop 340. Interfacing body 410 may slide up guide stop 340 slightly to slow the movement of guide interface member 400, and interfacing body 410 may then slide back down guide stop 340 to rest in guide trough 330. Once interfacing body 410 is stopped within guide trough 330, gate 100 may be in a stopped open position, wherein in a stopped open position gate 100 is held at a particular opening angle. As used herein, an "open position" encompasses a "stopped open position". In the illustrated embodiment, guide 300 and guide interface member 400 are configured to provide a stopped open position at an open angle of approximately 90°. Accordingly, when a user lifts gate 100 and positions interfacing body 410 above guide body 310, the user may release gate 100 and guide 300 and guide interface member 400 will guide gate 100 towards the stopped open position at approximately 90°. In embodiments, different angles for the stopped open position may be implemented by altering the location of guide trough 330. In embodiments, the stopped open position may be at an angle in the range of 30° to 180°, in the range of 30° to 120°, in the range of 45° to 180°, in the range of 75° to 180°, in the range of 90° to 180°, or other suitable angles.

Additionally, in the illustrated embodiments interfacing body 410 is generally aligned with/parallel to mounting plate 450 and gate 100, such that when interfacing body 410 is received in guide trough 330, interfacing body 410, mounting plate 450, and gate 100 are all aligned with guide trough 330 and have the same or similar opening angles. In some embodiments, interfacing body 410 may be angled relative to gate 100 and/or mounting plate 450 and may also be spaced apart from gate 100 and/or mounting plate 450 such that when interfacing body 410 is received in guide trough 330, interfacing body 410 may be at a different opening angle than gate 100 and/or mounting plate 450. For example, guide trough 330 may be positioned at an opening angle of approximately 180° and interfacing body 410 may be angled approximately 90° relative to mounting plate 450 and gate 100, such that when interfacing body 410 is received in guide trough 330 interfacing body 410 has an opening angle of approximately 180° but gate 100 has an opening angle of approximately Guide 300 may extend further than shown in the illustrated embodiments, and guide trough 330 may be positioned anywhere along guide 300. Additionally, guide 300 may comprise multiple guide troughs 330 such that gate 100 may be biased toward multiple different stopped open locations. In such embodiments, guide 300 may comprise multiple guide stops 340 between guide troughs 330. For example, guide 300 may extend along the entire opening range of gate 100 (e.g. −180 to 0° and 0° to 180° or 0° to 180°) and may comprise multiple guide troughs 330 at multiple opening angles such as 30°, 45°, 60°, 120°, and/or 180°. Guide troughs 330 may be present for inward and/or outward opening angles, since guide 300 may extend fully through the opening range of gate 100.

Additionally, gate system 500 may comprise multiple guides 300. For example, gate system 500 may comprise an inward guide for opening the gate inward, in the direction R1, and an outward guide for opening the gate outward, in the direction opposite R1. In such an embodiment, each guide may independently comprise one or multiple guide troughs 330 and may have the same features and functionality as described above with respect to a single guide 300. The inward guide may be discontinuous from the outward guide, or they may be coupled together or integral with one another. When gate 100 is positioned in a closed, lowered position, interfacing body 410 may be positioned between the two guides. In such an embodiment, gate catch 200 may be omitted from gate system 500, since interfacing body 410 and the two guides may restrain movement of gate 100 in a closed position.

Figure 7:
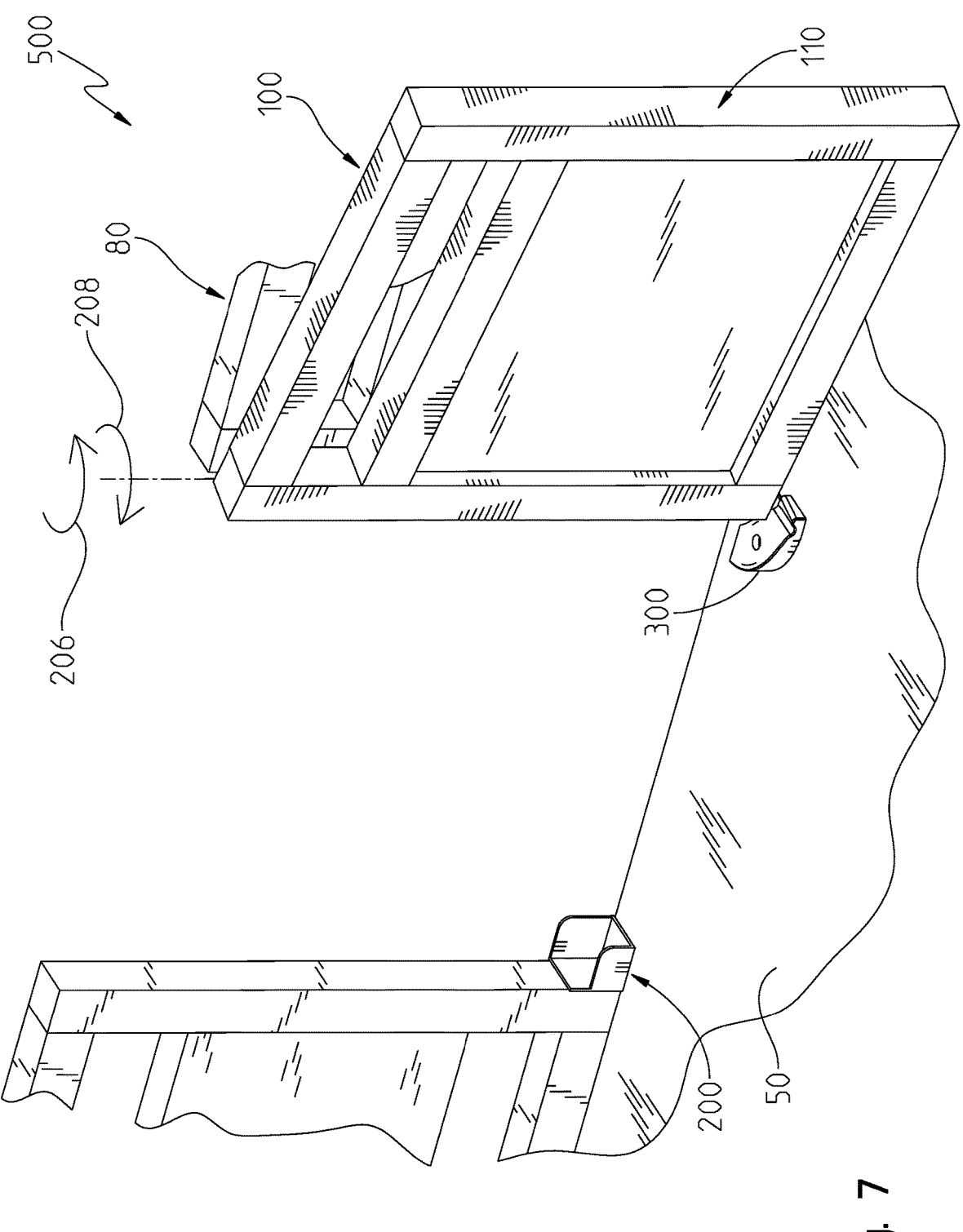

Referring still to FIGS. 4, 6, and 7 gate 100 may be moved from a stopped open position towards another open position, towards another stopped open position, and/or towards a closed position without a user lifting gate 100. In other words, gate 100 may be lifted to be closed through only a lateral force acting on gate 100, such as pushing or pulling in a direction perpendicular to the plane of gate 100. Pushing or pulling on gate 100 may cause interfacing body 410 to slide up a curved surface of guide 300 such as up guide surface 315 or the top of guide stop 340, thereby lifting gate 100 as it rotates. Gate 100 may be closed from an open position by pushing or pulling gate 100 from an open position towards a closed position, and guide 300 may bias guide interface member 400 and gate 100, upward such that the lower extent of lower end 102 is above H1 and gate 100 may pass over stopping member 210 of gate catch 200. Once past stopping member 210, gate 100 may lower into gate catch 200 under its own weight thereby placing gate 100 in a closed, lowered position.

As shown best in FIG. 7, gate 100 may be moved to an angle beyond that of guide trough 330, such that interfacing body 410 passes over guide stop 340. Gate 100 as shown in FIG. 7 has an obtuse opening angle relative to the adjacent portion of wall 82 about hinge 140. When gate 100 is moved beyond guide trough 330, gate 100 may swing or rotate freely, or may be biased back towards guide trough 330 by guide stop 340 or guide surface 315. In some embodiments where guide 300 does not extend along the entire opening angle range of gate 100, interfacing body 410 and/or gate 100 may be moved beyond the extent of guide 300. In some embodiments, a portion of interfacing body 410 may still contact a portion of guide stop 340 when gate 100 is opened beyond guide trough 330. Guide stop 340 may be generally curved or sloped, similar to guide surface 315, to allow for movement of interfacing body 410 along the surface of 340 without lifting from a user or without catching any facets or edges. In the illustrated embodiment, guide stop 340 has a steeper slope between than at least a portion of guide surface 315.

Referring to FIGS. 2, 3, and 5-7, in summary gate 100 may be opened by lifting gate 100 in a direction D1, opening gate 100 an amount in the direction R1 to position interfacing body 410 above guide body 310, and releasing gate 100, allowing guide 300 to guide gate 100 to a further opening angle, and receiving interfacing body 410 in guide trough 330 to bring gate 100 to a stopped opening position. Gate 100 may be opened beyond the stopped opening position defined by guide trough 330 and may be opened to multiple stopped opening positions with multiple guide troughs 330 and/or multiple guides 300. Gate 100 may be closed from an open position without requiring a user to life gate 100 by moving gate 100 in a direction towards a closed position and sliding interfacing body 410 up guide surface 315 thereby biasing gate 100 upward and enter a closed position.

Referring to FIGS. 8-13 provide another exemplary embodiment of a guide 1300 and a guide interface member 1400. More specifically guide 1300 and guide interface member 1400 are positioned with respect to gate 100 in an alternative configuration and provide an alternative geometry while retaining the ability to open and close gate 100 as previously discussed.

Figure 8:
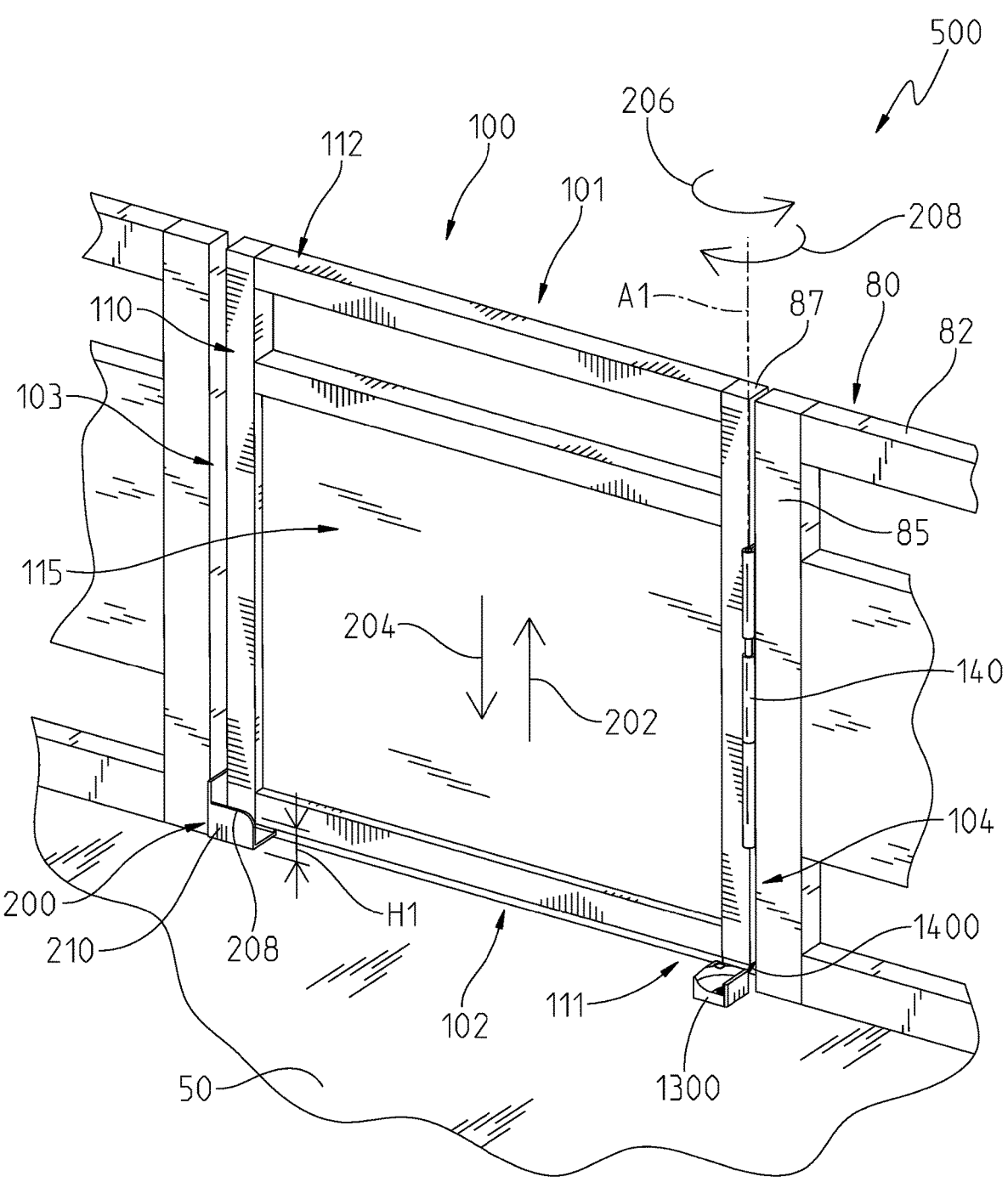
FIGS. 8 and 9 illustrate lifting of a gate with another exemplary gate system.

Referring to FIG. 8, guide 1300 is coupled to the gate support structure of boat 10, illustratively to deck 50 with a fastener. Guide interface member 1400 is coupled to and carried by gate 100. More specifically, guide interface member 1400 is positioned with gate frame 111 (e.g., vertical frame member 87). Guide interface member 1400 is positioned, for example, as an end cap in gate frame 111 when gate frame is coupled to post 84 via hinge 140. As gate frame 111 may be formed of a variety of materials, including metals such as aluminum, end caps may be provided for capping off sections of material that form gate 100 (e.g., when formed of a hollow tube including rectangular and square tubing or for capping of a solid bar). In some embodiments, guide interface member 1400 is coupled to gate frame 111 via fasteners such as bolts or rivets. In other embodiments, guide interface member 1400 is coupled to gate 100 by guide interface member 1400 being received into gate frame 111 and is retained via an interference fit. It is understood that guide interface member 1400 may also include other structures for ensuring retention on gate frame 111, including but not limited to fasteners, adhesives, structural features, and so forth.

Figure 14:
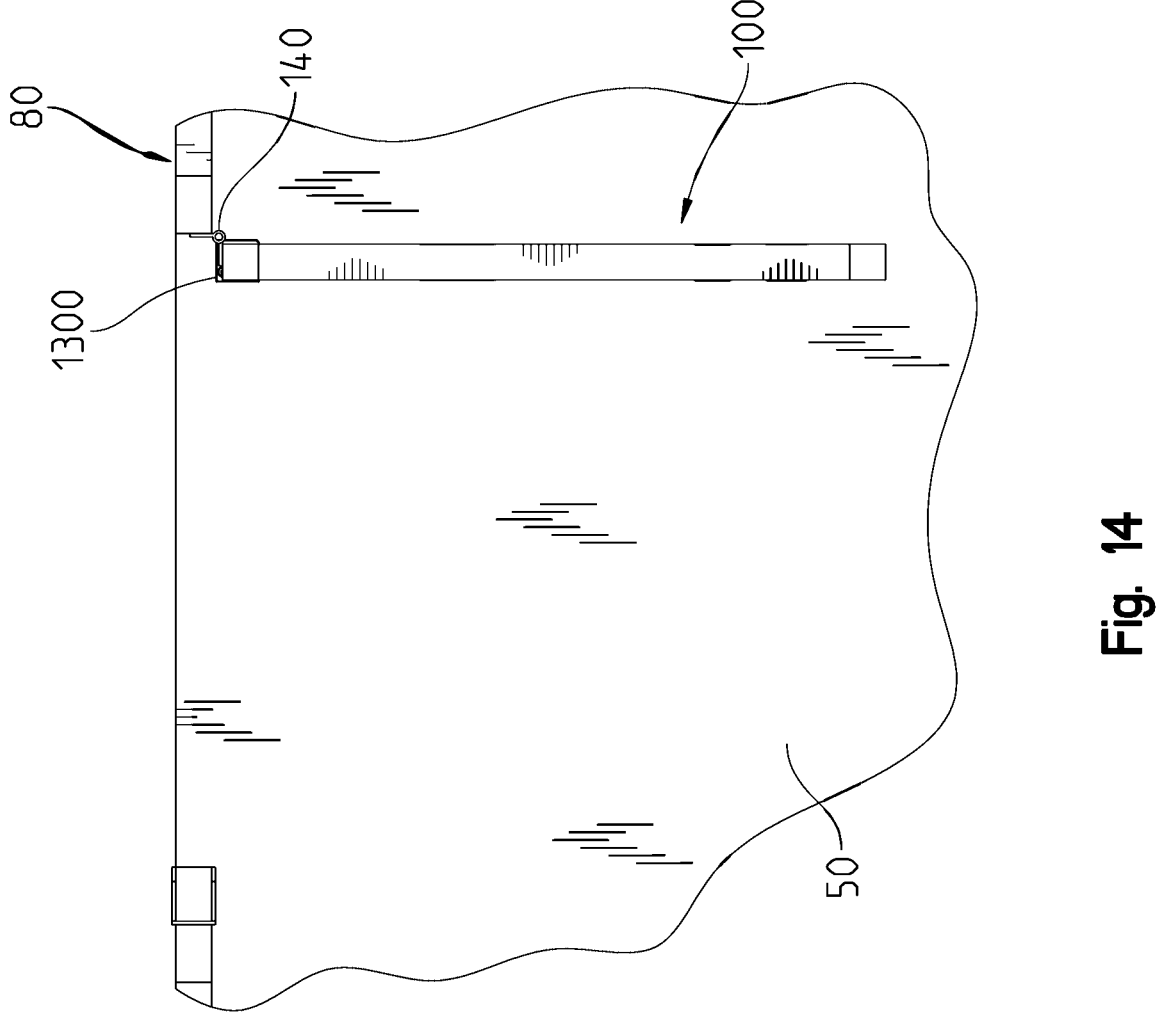
FIGS. 14 and 15 illustrate a profile of the gate system of FIG. 10 relative to the gate and the walkway.
Figure 15:
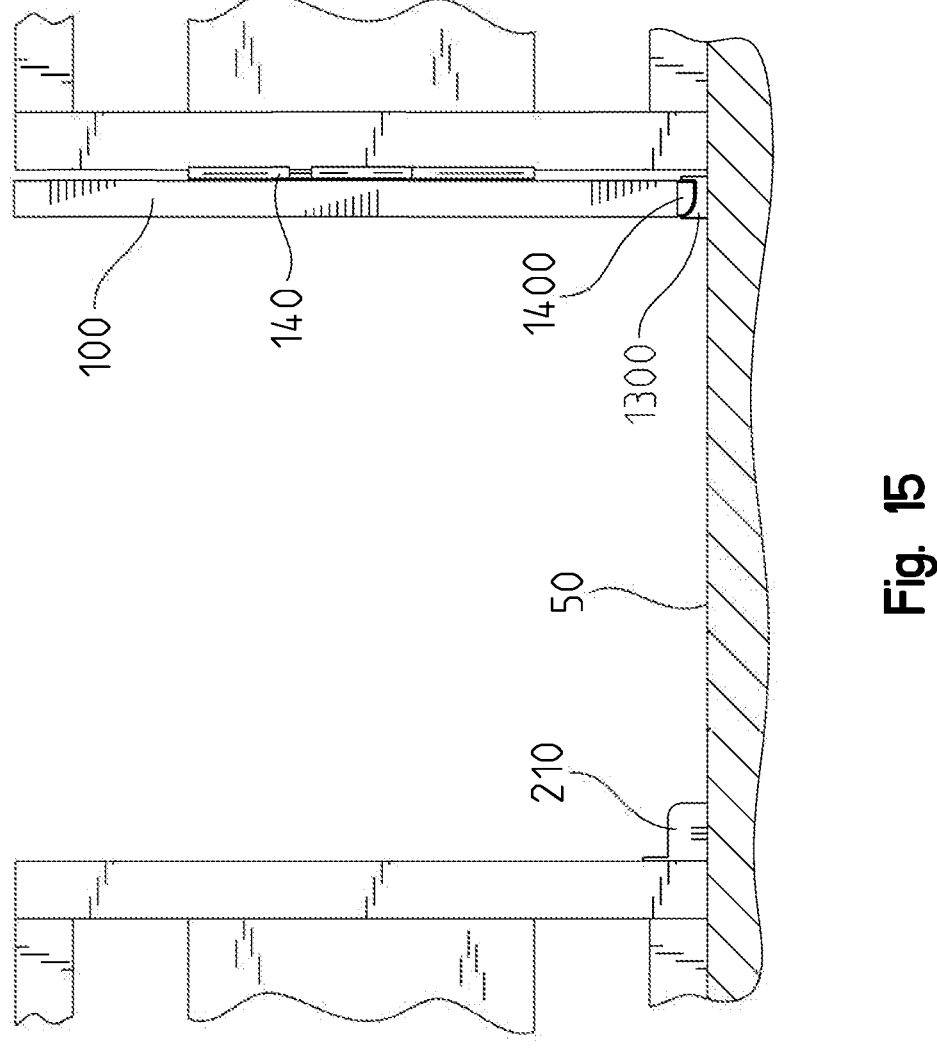

Guide interface member 1400 is provided such that when installed with gate frame 111, guide interface member 1400 does not extend outside of or extends less than an inch outside of the profile of gate 100 when viewing from the top down. This provides a discreet and minimal profile to the guide system for gate 100. Furthermore, guide interface member 1400 is positioned such that it does not extend beyond or extends less than an inch toward lower rail 113 such that guide interface member 1400 has minimal horizontal overlap with lower rail when viewed from the side. By positioning guide interface member 1400 with gate frame 111, which is coupled to hinge 140, the guide interface member 1400 and guide 1300 are positioned in line with enclosure system 80 when gate 100 is in a closed position. This facilitates the positioning of guide 1300 in such a manner that it neither protrudes into the opening or walkway lane of the enclosure system 80 when gate 100 is in an open position and limits protrusion into the empty floor space of deck 50 when gate 100 is in a closed position (see FIGS. 14 and 15). This allows gate 100 to interface with guide 1300 in the opened position to hold gate 100 in the opened position, wherein gate 100 and the wall 82 cooperate to define a walkway lane when gate 100 is in the opened position where guide 1300 is positioned outside of the walkway lane.

Figure 9:
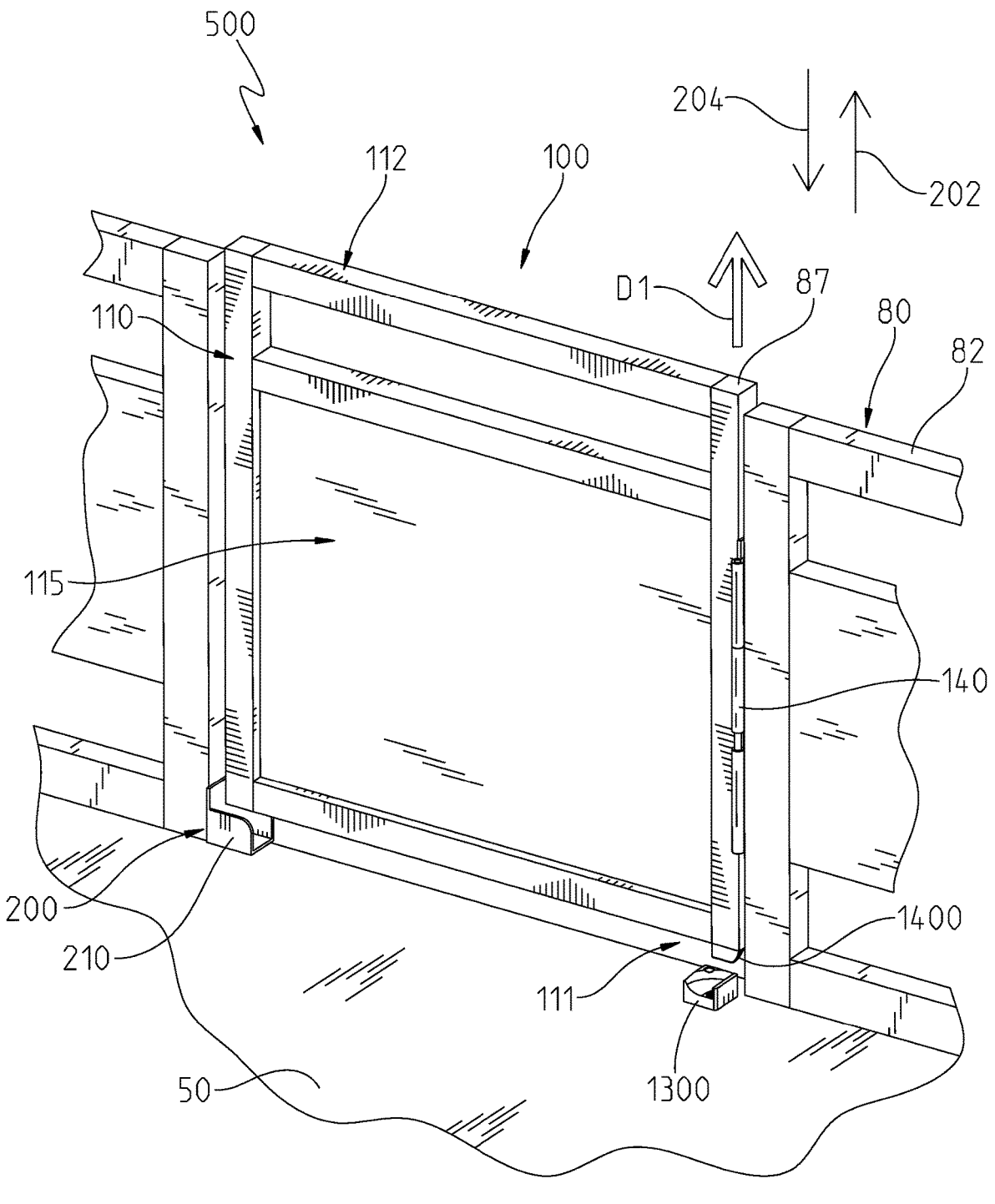

Similar to the embodiments previously discussed, guide 1300 and guide interface member 1400 are configured to operate to facilitate opening and closing of gate 100. Referring to FIG. 9, once gate 100 is lifted by a user in direction 202, a lower edge of guide interface member 1400 is positioned vertically higher than guide 1300. If gate 100 is rotated by the user about hinge 140 (axis A1) in direction 206 guide interface member 1400 may be positioned over guide 1300 and lowered in direction 204 to contact guide 1300. The user may then release gate 100. Once released, the weight of gate 100 will bias guide interface member 1400 towards guide 1300 (if not already contacting guide 300) and guide 300 will bias gate 100 towards an open position (see FIGS. 11 and 12). To close gate 100, a user may apply a lateral force (push or pull) to gate 100 towards the closed position in direction 208 without lifting gate 100, and guide 300 will bias gate 100 upward to clear gate catch 200 and allow gate 100 to close. Alternatively, a user may simply lift gate 100 and guide interface member 1400 in direction 202 to separate guide interface member 1400 from guide 1300 and rotate gate 100 towards the closed position in direction 208.

In FIG. 8, gate 100 is shown in a closed position, which may also be referred to as a first position. Gate 100 illustratively includes a gate frame 110, an upper rail 112, and a gate panel 115. Gate 100 generally extends vertically between an upper end 101 and a lower end 102, and horizontally between a first end 103 and a second end 104. Gate 100 is rotatably coupled to a post 85 of an adjacent portion of wall 82 of enclosure system 80 through hinge 140 proximate second end 104 which allows for rotation of gate 100 around the axis A1 of hinge 140 in directions 206 and 208. Upper rail 112 may act as a handle or interactive member for a user to grab or interact with gate 100 to actuate a movement of gate 100 relative to the adjacent portion of wall 82 of enclosure system 80. For example, a user may grab or otherwise contact upper rail 112 to lift, push, or pull gate 100. Gate 100 may also include additional interactive features or components not illustrated, such as handles, knobs, latches, recesses, buttons, locking mechanisms, bumpers, grip surfaces, coatings, and any other feature found on gates. Additionally, gate 100 and/or the gate support structure may include biasing members to bias gate 100 towards an open or closed position, such as springs. Gate 100 may also comprise biasing members to bias gate 100 upwards or downwards between lifted and non-lifted positions.

Similar to previous discussions, gate catch 200 retains gate 100 in a closed position and comprises at least one stopping member 210. Stopping member 210 is configured to interact with at least a portion of gate 100 to prevent movement of gate 100 beyond a threshold. In the illustrated embodiment, gate catch 200 comprises two stopping members 210 (See FIG. 6) to prevent gate 100 from opening outward or inward while positioned between the two stopping members 210. Additionally, when gate 100 is in the closed position, guide 1300 may act to limit rotation of gate 100 toward the open position by providing mechanical interference against guide interface member 1400.

Referring now to FIG. 9, gate 100 is shown in a lifted position, which may also be referred to as a first position (relative to an open position) or a second position (relative to a closed, lowered position). In order to open gate 100, a user may lift gate 100 upward in direction 202 (illustrated as direction D1) (which is generally parallel with axis A1) by a height that the lower extent of lower end 102 of gate 100 is positioned above stopping member 210. Once lifted, gate 100 may no longer be retained within gate catch 200 and may swing freely about axis A1. In the illustrated embodiments, gate 100 is shown as opening inward relative to the boat 10, but gate 100 may be opened inwardly or outwardly based on the configuration of hinge 140. It is noted that the height that gate 100 is lifted to clear stopping member 210 is also sufficient for guide interface member 1400 to clear guide 1300 when gate is rotated from the closed position to the open position.

Figure 10:
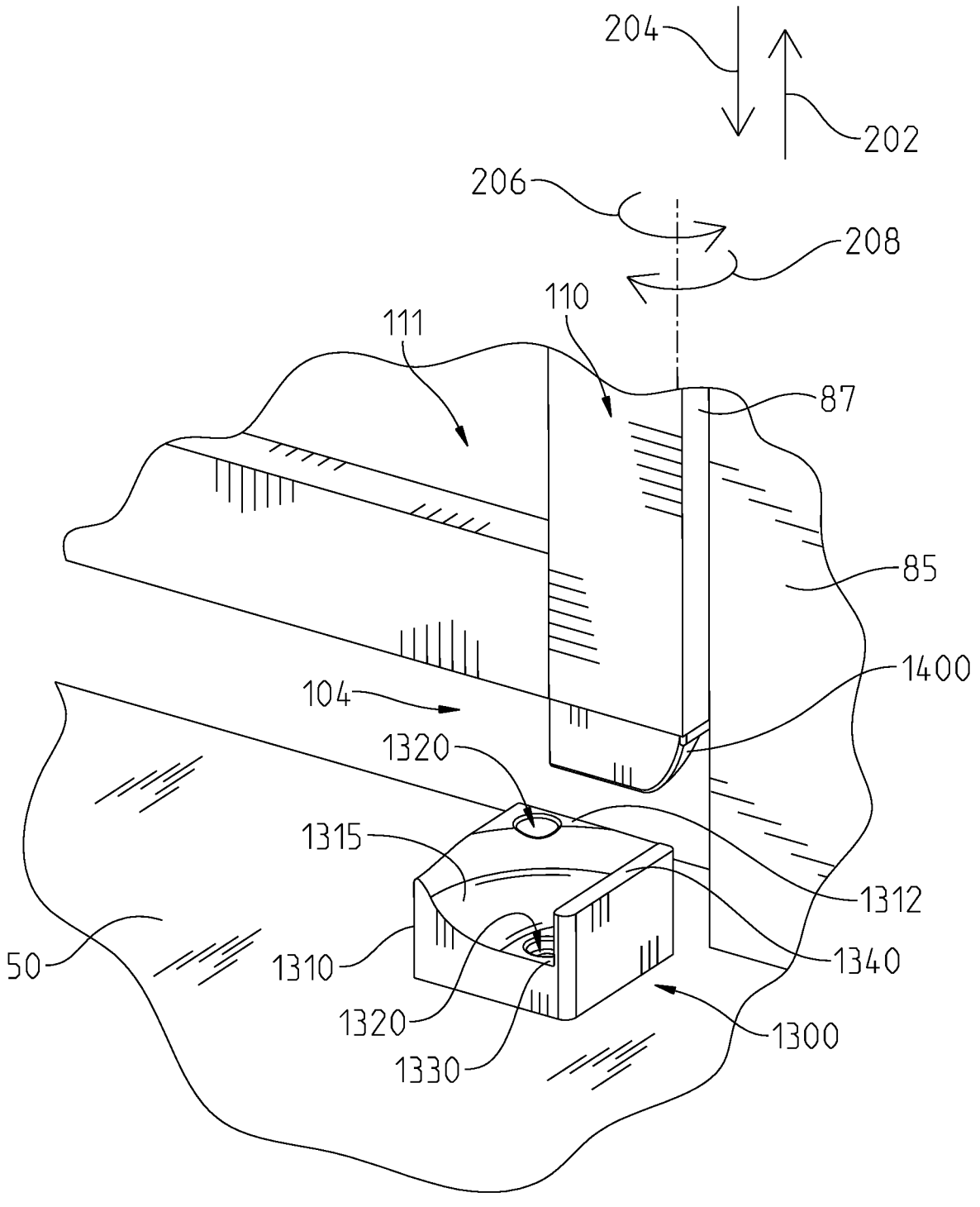
FIG. 10 illustrates the gate system of FIGS. 8 and 9.

Referring to FIG. 10, guide 1300 and guide interface member 1400 are shown in greater detail, which are both positioned proximate the second end 104 of gate 100. As previously noted, by positioning guide interface member 1400 within gate frame 111 (e.g. within vertical frame member 87), guide 1300 and guide interface member 1400 are positioned close to or at second end 104 and proximate post 85. Guide 1300 comprises a guide body 1310, an upper edge 1312, a guide surface 1315, a fastening feature 1320, a guide trough 1330, and a guide stop 1340. Guide 1300 generally extends from deck 50 to upper edge 1312. Guide 1300 generally includes an outer profile similar an outer profile of guide interface member 1400 when viewed from above such that when guide interface member 1400 is engaged with guide 1300, guide 1300 is concealed or substantially concealed (e.g., greater than 80%) by guide interface member 1400, when viewed from above. This means that both guide 1300 and guide interface member 1400 sit substantially within the profile of gate frame 111 when gate 100 is in the open position such that guide 1300 and guide interface member 1400 are substantially concealed (e.g., greater than 80%) when viewed from above (See FIGS. 14 and 15).

Guide 1300 includes guide surface 1315 that sloping downward from upper edge 1312 towards guide trough 1330. In some embodiments, guide includes first upper edge 1312a and second upper edge 1312b which are positioned adjacent to each other. For example, if guide 1300 is quadrangular, first and second upper edges 1312a, 1312b are adjacent edges. Guide surface 1315 extends from first and second upper edges 1312a, 1312b toward guide trough 1330. In some embodiments, guide surface 1315 forms a portion of a bowl shape (e.g., a quarter bowl shape), such that the guide surface 1315 transition smoothly from first and second upper edges 1312a, 1312b toward guide trough 1330. The slope of guide surface 1315 may be constant or variable along its length, and guide surface 1315 may comprise any curved, or straight profile at any point along its length. The profile of guide surface 1315 as illustrated is provided to maximize surface contact between guide 1300 and guide interface member 1300 during use in order to distribute load across the surface to limit wear patterns. Various angles and transitions of guide surface 1315 may be modified to provide specific haptic feedback profiles of closing profiles (e.g., smooth transition profile, quick-close profile including steep angles near first and second upper edges 1312a, 1312b, and so forth). Additionally, various profiles and slopes may be implemented depending on the materials being used for guide 1300 and guide interface member 1400, weight of gate 100, and so forth, in order to provide the optimal experience and security for the user.

Guide 1300 may be mounted to deck 50 through a recess 1320. Recess 1320 may be configured to receive a fastener such as a screw, bolt, rivet, nail, pin, or any other suitable fastening device to couple guide 1300 to deck 50. Any number of recesses 1320 may be present on guide 1300. In addition to recesses 1320, guide 1300 may be coupled to deck 50 through any other suitable fastening systems, such as adhesives, welds, protrusions/detents, latches, clips, or any other fastening system. Additionally, guide 1300 may be integral to the deck 50. Guide 1300 may be composed of a metal, polymer, natural products (e.g. wood), or any other suitable material as well as combinations thereof (e.g. polymer coated metal), and may be manufactured through any process as is known in the art such as molding, machining, welding, casting, and additive manufacturing.

Guide interface member 1400 comprises an interfacing body 1410, an interfacing surface 1415, a mounting portion 1450 including a plurality of ribs 1420. Guide interface member 1400 is generally coupled to gate frame 111 proximate lower end 102 of gate 100 at second end 104 and extends at least partially below lower end 102. Guide interface member 1400 may be coupled to gate 100 as an end cap for gate frame 111 such that guide interface member 1400 extends into the lower end of gate frame 111. Mounting portion 1450 extend into gate frame 111 such that interfacing surface 1415 is positioned facing toward guide 1300 and exposed. Mounting portion 1450 may include ribs 1420 or other features to provide an interference fit between guide interface member 1400 and gate frame 111. Fastening features 1420 may also include one or more of a screw, bolt, rivet, nail, pin, or any other suitable fastening device. Guide interface member 1400 may also couple with gate 100 through any other suitable fastening systems, such as adhesives, welds, protrusions/detents, latches, clips, or any other fastening system. Additionally, guide interface member 1400 may be integral to the gate 100. Guide interface member 1400 may be composed of a metal, polymer, natural products (e.g. wood), or any other suitable material as well as combinations thereof (e.g. polymer coated metal), and may be manufactured through any process as is known in the art such as molding, machining, welding, casting, and additive manufacturing.

When gate 100 is in a closed, non-lifted position as shown in FIG. 8, the lower extent of interfacing body 1410 is positioned below upper edge 1312 of guide 1300. Upper edge 1312 may have a height relative to deck 50 of H1 or less than H1, such that when gate 100 is lifted as shown in FIGS. 9 and 10, and lower end 102 is at or above H1 (and therefore at or above stopping member 210), the lower extent of interfacing body 1410 may be positioned at or above upper edge 1312.

Figure 11:
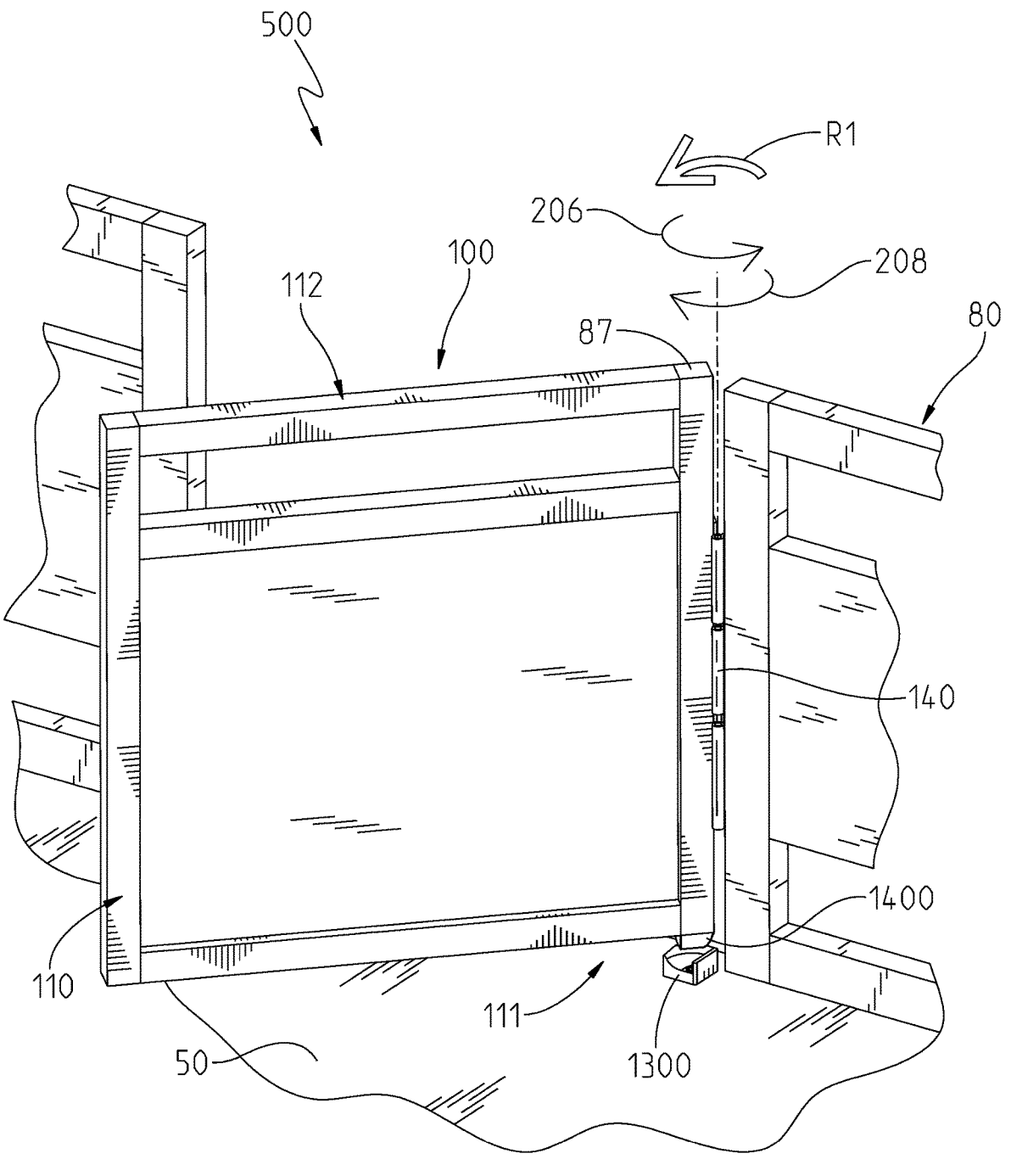
FIGS. 11 and 12 illustrate movement of the gate of the gate system of FIG. 10 from the lifted position of FIG. 9 to multiple open positions.
Figure 12:
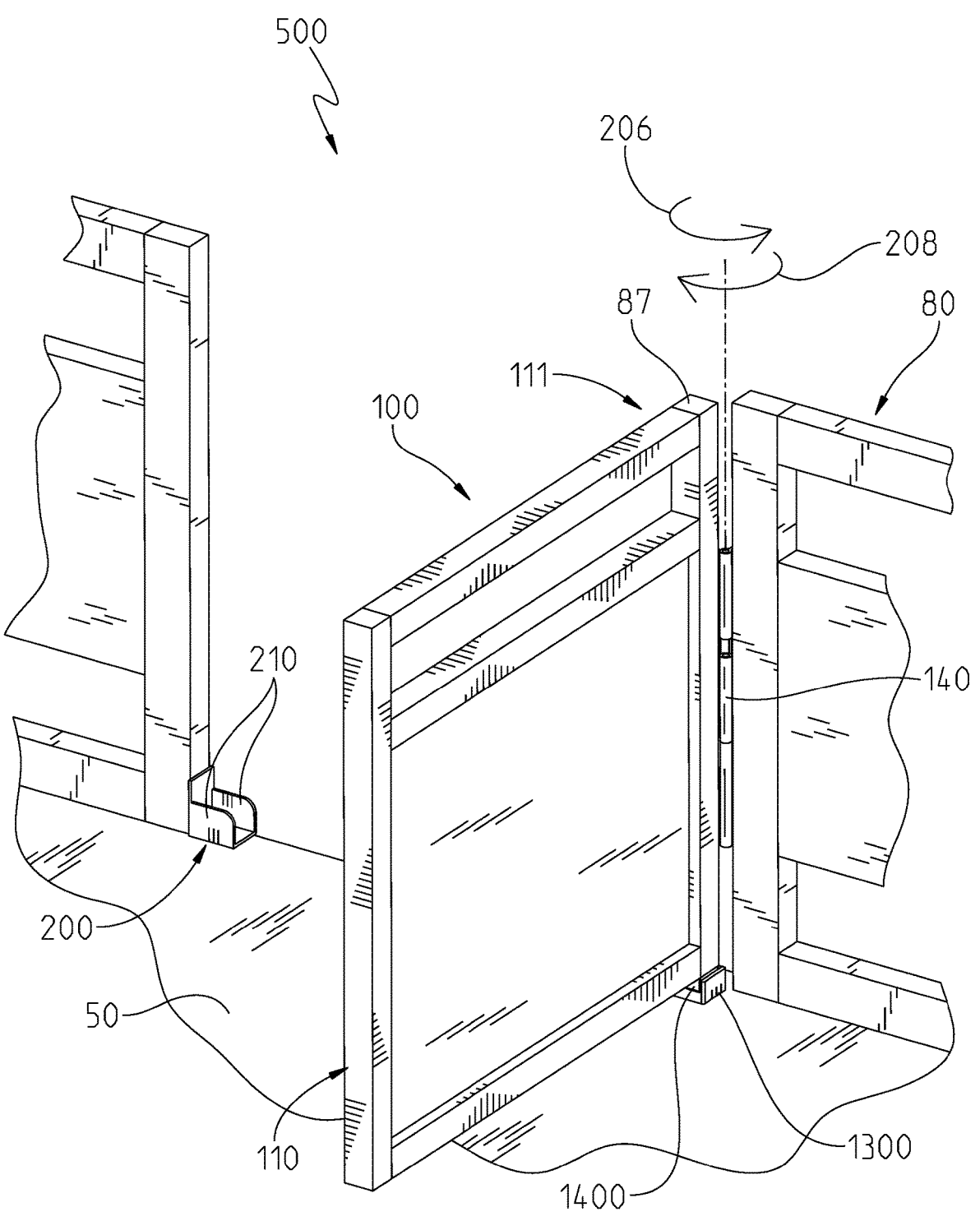
Figures 13A, 13B:
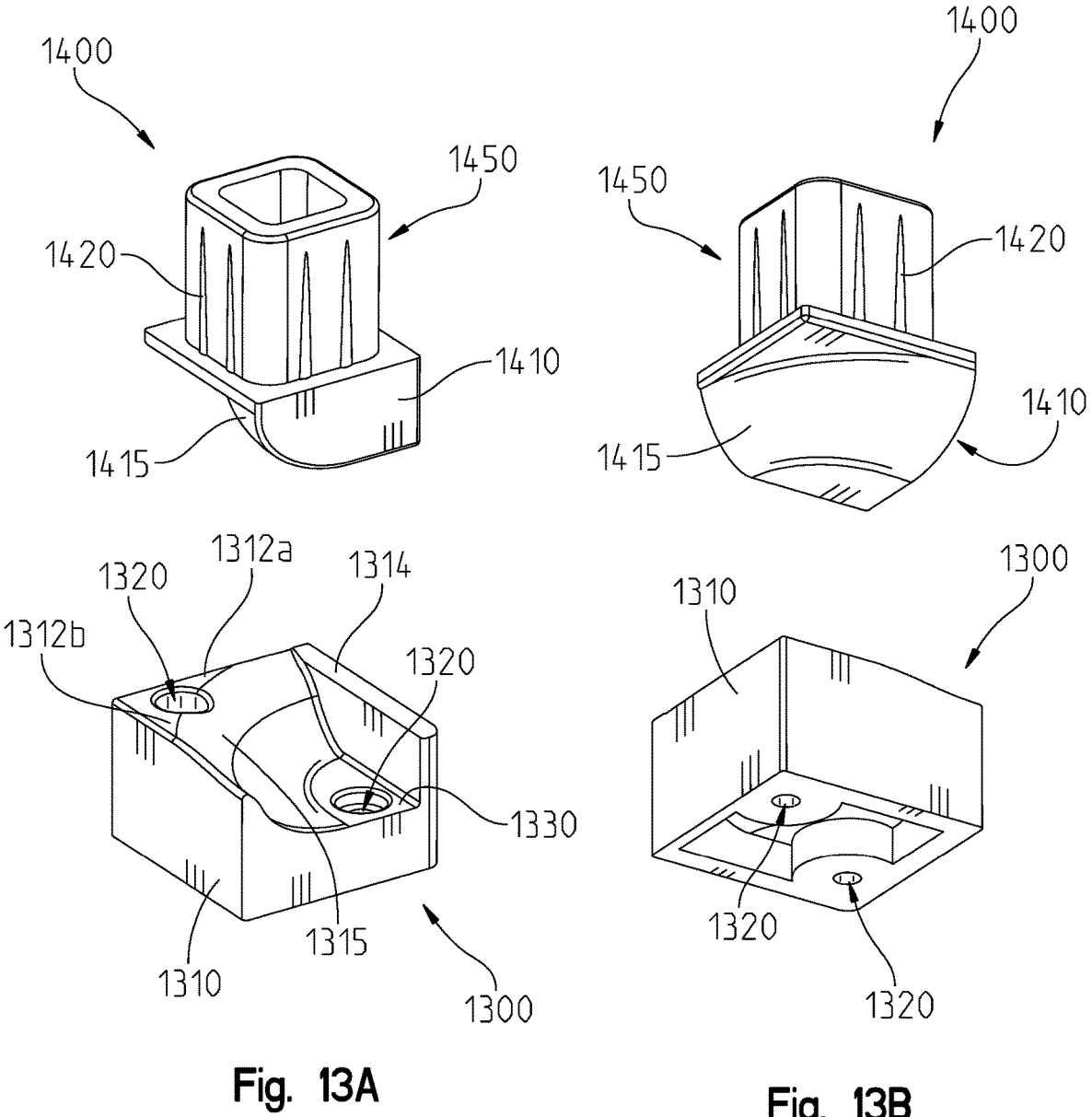
FIGS. 13A and 13B illustrate components of the gate system of FIG. 10.

Referring now to FIGS. 11 and 12, gate 100 may be rotated in direction 206 (designated R1 in FIG. 5) towards an open position. An open position may be any position that is not a closed position, encompassing any degree of opening greater or less than zero degrees relative to a closed position. Stated differently, an open position may encompass an opening angle from −180° to −1° and from 1° to 180°, relative to a closed position (where a negative angle may indicate an outward opening, and a positive angle may indicate an inward opening). An opening angle as used herein refers to the angle between gate 100 and the adjacent portion of wall 82 coupled to hinge 140 at an open position relative the closed position, such that when gate 100 is closed it has an opening angle of approximately 0°. An open position may be referred to as a second position (relative to a lowered closed position or a lifted closed position) or as a third position (relative to a lowered closed position). Once gate 100 is opened to a degree such that interfacing body 1410 extends at least partially over guide surface 1315 of guide 300, gate 100 may be lowered such that interfacing surface 1415 may contact guide surface 1315. Gate 100 may be released by a user, and guide 1300 will then bias guide interface member 1400, and gate 100 to which guide interface member 1400 is coupled, towards a stopped open position defined by the positioning of guide trough 1330 and guide stop 1340. The ramped surface 1315 of guide body 1310 biases interfacing body 1410 to move towards guide trough 1330 as interfacing body 1410 moves downward under the weight of gate 100. Guide surface 1315 and interfacing surface 1415 may be composed of relatively smooth materials with low coefficients of friction to allow for easy sliding of interfacing surface 1415 along guide surface 1315. Additionally, guide surface 1315 and/or interfacing surface 1415 may comprise a coating to reduce friction between guide surface 1315 and interfacing surface 1415. Interfacing body 1410 and guide body 1310 may comprise a generally curved cross-section or profile to allow for smooth sliding without facets or edges.

Interfacing body 1410 is configured to slide towards guide trough 1330 which may be positioned at the bottom of guide surface 1315 (e.g., the downwardly sloped portion of guide body 1310). Interfacing body 1410 may be configured to interact with guide trough 1330 such that interfacing body 1410 may be received within guide trough 1330. Interfacing body 1410 may slow or stop sliding once interfacing body 1410 enters guide trough 1330 and contacts guide stop 1340. Guide stop 1340 may form one of the boundaries defining the quarter bowl shape of the guide surface 1315 and guide trough 1330. In some embodiment, the remaining side of guide 1300 may be open as illustrated or may be closed in order to provide reinforcement to guide stop 1340 (not shown). Interfacing body 1410 contacts guide stop 1340 which limits the movement of guide interface member 1400 movement of gate 100 from pivoting beyond guide stop 1340. When interfacing body 1410 is contacting guide stop 1340 and interfacing body 1410 is resting in guide trough 1330, gate 100 is positioned in a stopped open position, wherein in a stopped open position gate 100 is held at a particular opening angle. As used herein, an "open position" encompasses a "stopped open position". In the illustrated embodiment, guide 1300 and guide interface member 1400 are configured to provide a stopped open position at an open angle of approximately 90°. Accordingly, when a user lifts gate 100 and positions interfacing body 1410 above guide body 1310, the user may release gate 100 and guide 1300 and guide interface member 1400 will guide gate 100 towards the stopped open position at approximately 90°. In embodiments, different angles for the stopped open position may be implemented by altering the geometry of guide 1300 and guide stop 1340. In embodiments, the stopped open position may be at an angle in the range of 30° to 180°, in the range of 30° to 120°, in the range of 45° to 180°, in the range of 75° to 180°, in the range of 90° to 180°, or other suitable angles.

Gate 100 may be moved from a stopped open position towards a closed position without a user lifting gate 100. In other words, gate 100 may be lifted to be closed through only a lateral force acting on gate 100, such as pushing or pulling in a direction perpendicular to the plane of gate 100. Pushing or pulling on gate 100 may cause interfacing body 1410 to slide up a guide surface 1315 of guide 1300, thereby lifting gate 100 as it rotates. Gate 100 may be closed from an open position by pushing or pulling gate 100 from an open position towards a closed position, and guide 1300 may bias guide interface member 1400 and gate 100, upward such that the lower extent of lower end 102 is above H1 and gate 100 may pass over stopping member 210 of gate catch 200. Once past stopping member 210, gate 100 may lower into gate catch 200 under its own weight thereby placing gate 100 in a closed, lowered position.

As previously discussed guide 1300 and guide interface member 1400 include similar outer profiles (e.g., when viewed from above). For example, guide 1400 may include a first outer profile that is substantially similar in shape and size as a second outer profile of guide interface member 1400. The first profile and second profile may be about 80% to about 100% similar in size and shape to the second outer profile. The first outer profile and the second outer profile may be quadrangular. In some embodiments, guide surface 1315 includes and interfacing body 1410 includes an interfacing surface 1415 that is complimentary to guide surface 1315 (e.g., an inverse quarter bowl shape). The shape of the guide surface 1315 and interfacing surface 1415 facilitate smooth transition of gate 100 from the open position toward the closed position as well as providing a ramp up from the closed position toward the open position. The interfacing surface 1415 and the guide surface 1315 are configured such that interfacing surface 1315 and the guide surface 1415 have increasing contact by surface area as gate 100 transitions from the closed position toward the open position. Once gate 100 reaches the open position, guide interface member 1400 contacts guide stop 1340 (e.g., side wall of interfacing body 1410 contacts guide stop 1340).

In some embodiment, gate 100 may be moved to an angle beyond that of guide trough 1330. This is accomplished by lifting 100 such that interfacing body 1410 is positioned vertically higher than guide stop 1340 and rotating gate such that interfacing body 1410 passes beyond guide stop 1340. When gate 100 is moved beyond guide stop 1340, gate 100 may swing or rotate freely. Gate 100 must be lifted and rotated in the reverse manner to again clear guide stop 1340 in order to position interfacing body 1410 in guide trough 330 and to move gate 100 toward closed position. In some embodiments, guide stop 1340 may be provided such that even when gate 100 is lifted and rotated, interfacing body 1410 is not able to clear guide stop 1340. This would provide an absolute limit to the degree of opening of gate 100 in the direction of guide 1300.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A pontoon boat comprising:
   a plurality of pontoons;
   a deck supported by the plurality of pontoons;
   an enclosure system supported by the deck, the enclosure system including a wall, a gate support structure, a gate including a vertical frame member rotatably coupled to the gate support structure, and a guide system including a first portion being coupled to a lower portion of the gate and extending beyond a lower edge of the gate and a second portion extending above a top surface of the deck, wherein the gate is movable from a first position to a second position, the guide system including a guide and a guide interface member, wherein one of the first portion and the second portion of the guide system includes the guide and another of the first portion and the second portion includes the guide interface member, wherein the guide interface member of the guide system slides along a surface of the guide to bias the gate from the first position to the second position.

2. The pontoon boat of claim 1, wherein the second portion of the guide system includes the guide and the first portion of the guide system includes the guide interface member, the first portion being an end cap coupled to a lower end of the vertical frame member of the gate.

3. The pontoon boat of claim 2, wherein the guide comprises a guide trough configured to receive the guide interface member.

4. The pontoon boat of claim 3, wherein the second position is an open position and in the second position the guide interface member is received within the guide trough.

5. A pontoon boat comprising:
a plurality of pontoons;
a deck supported by the plurality of pontoons;
an enclosure system supported by the deck, the enclosure system including a wall, a gate support structure, a gate including a vertical frame member rotatably coupled to the gate support structure, an end cap coupled to a lower end of the vertical frame member and including an interfacing body downward from the vertical frame member, and a guide coupled to the deck, wherein the guide includes a surface configured to receive the interfacing body and bias the gate toward an open position, wherein the guide is positioned substantially within a profile of the gate when viewed from above the enclosure along a direction perpendicular to a rotational axis of the gate.

6. The pontoon boat of claim 5, wherein the end cap and the guide each define a quadrangular outer profile when viewed from above.

7. The pontoon boat of claim 5, wherein the guide defines a guide surface including a quarter bowl shape.

8. The pontoon boat of claim 7, wherein the interfacing body of the end cap includes an interfacing surface that is complimentary to the guide surface.

9. The pontoon boat of claim 8, wherein the interfacing surface and the guide surface are configured such that the interfacing surface and the guide surface have increasing contact by surface area as the gate transitions from the closed position toward the open position.

10. The pontoon boat of claim 5, wherein, when the gate is in the open position, the guide does not extend beyond a vertical plane defined by an exterior side of the gate.

11. The pontoon boat of claim 5, wherein, when the gate is in a closed position, the guide is positioned adjacent to a vertical plane defined by an interior side of the gate, the guide extending less than 2 inches inward from the vertical plane.

12. The pontoon boat of claim 5, wherein the enclosure system includes a gate catch operable to retain the gate in the closed position, wherein the gate catch includes a stopping member, wherein the stop member is vertically higher than the guide.

13. A guide system for a gate configured to pivot between an open positioned and a closed position, the guide system comprising:
an end cap configured to couple to a lower end of a vertical frame member of a gate, the end cap including an interfacing body configured to be positioned facing downward when coupled to the gate, the end cap defining a first outer profile when viewed from above; and
a guide coupled to the deck, wherein the guide includes a guide surface configured to receive the interfacing body, wherein the guide includes a second outer profile when viewed from above, wherein the second outer profile and the first outer profile are substantially similar in size and shape.

14. The guide system of claim 13, wherein the first outer profile is from about 80% to about 100% similar in size and shape to the second outer profile.

15. The guide system of claim 13, wherein the first outer profile and the second outer profile are quadrangular.

16. The guide system of claim 13, wherein the guide surface includes a quarter bowl shape.

17. The guide system of claim 16, wherein the interfacing body includes an interfacing surface that is complimentary to the guide surface.

18. The guide system of claim 17, wherein the interfacing surface and the guide surface are configured such that the interfacing surface and the guide surface have increasing contact by surface area as the gate transitions from the closed position toward the open position.

19. The guide system of claim 16, wherein the guide includes a guide stop defining a boundary of the guide surface, wherein the guide stop is configured to contact a side wall of the interfacing body.

20. The guide system of claim 19, wherein the guide has an open end of the guide surface adjacent to the boundary of the guide surface.

21. A pontoon boat comprising:
a plurality of pontoons;
a deck supported by the plurality of pontoons;
a guide supported by the plurality of pontoons;
an enclosure system supported by the deck, the enclosure system including a wall and a gate movable relative to the wall between a closed position wherein the gate is inline with the wall and an opened position, the gate interfacing with the guide in the opened position to hold the gate in the opened position, the gate and the wall cooperating to define a walkway lane when the gate is in the opened position, the guide being outside of the walkway lane.

22. The pontoon boat of claim 21 wherein the gate is angled relative to the wall at least 75 degrees.

* * * * *